United States Patent [19]
Flowerdew et al.

[11] Patent Number: 6,134,420
[45] Date of Patent: Oct. 17, 2000

[54] VECTOR MEASURING AERIAL ARRAYS FOR MAGNETIC INDUCTION COMMUNICATION SYSTEMS

[75] Inventors: Peter M. Flowerdew; David Huddart, both of Bristol, United Kingdom

[73] Assignee: Plantronics, Inc., Santa Cruz, Calif.

[21] Appl. No.: 09/010,807

[22] Filed: Jan. 22, 1998

Related U.S. Application Data

[63] Continuation-in-part of application No. 08/742,337, Nov. 1, 1996, Pat. No. 5,966,641.

[51] Int. Cl.$^7$ .................................................. H04B 5/02
[52] U.S. Cl. ........................... 455/41; 455/129; 455/269; 455/562; 343/867
[58] Field of Search ................................... 343/867, 788; 455/41, 129, 269, 562, 274, 517

[56] References Cited

U.S. PATENT DOCUMENTS

| | | | |
|---|---|---|---|
| 1,554,231 | 9/1925 | Press . | |
| 3,569,969 | 3/1971 | Lemon, Jr. | 343/225 |
| 3,591,710 | 7/1971 | Uetake et al. . | |
| 3,601,550 | 8/1971 | Spracklen | 179/82 |
| 3,660,760 | 5/1972 | Schaad et al. | 325/28 |
| 3,711,651 | 1/1973 | Connell | 179/15 BT |
| 3,750,180 | 7/1973 | Fujimoto et al. . | |
| 3,766,476 | 10/1973 | Silitch | 325/26 |
| 3,809,825 | 5/1974 | Schaad et al. | 179/82 |
| 4,250,507 | 2/1981 | Wingard | 343/742 |
| 4,747,158 | 5/1988 | Goldberg et al. | 455/11 |
| 4,751,515 | 6/1988 | Corum . | |
| 4,908,869 | 3/1990 | Lederman | 381/79 |
| 4,922,261 | 5/1990 | O'Farrell | 343/742 |
| 4,941,201 | 7/1990 | Davis | 455/41 |
| 5,027,709 | 7/1991 | Slagle | 102/427 |
| 5,032,947 | 7/1991 | Li et al. . | |
| 5,258,766 | 11/1993 | Murdoch | 343/742 |
| 5,321,412 | 6/1994 | Kopp et al. | 343/742 |
| 5,420,579 | 5/1995 | Urbas et al. . | |
| 5,426,409 | 6/1995 | Johnson | 336/178 |
| 5,437,057 | 7/1995 | Richley et al. | 455/41 |
| 5,568,005 | 10/1996 | Davidson . | |
| 5,568,616 | 10/1996 | Strohallen et al. | 375/259 |
| 5,612,652 | 3/1997 | Crosby | 333/24 |
| 5,694,139 | 12/1997 | Saito et al. | 343/866 |
| 5,734,353 | 3/1998 | Van Voorhies . | |
| 5,771,438 | 6/1998 | Palermo et al. | 455/41 |
| 5,966,641 | 10/1999 | Flowerdew | 455/41 |

FOREIGN PATENT DOCUMENTS

| | | | |
|---|---|---|---|
| WO 92/00635 | 1/1992 | European Pat. Off. | 455/41 |
| WO 96/37052 | 11/1996 | European Pat. Off. | H04B 5/02 |

(List continued on next page.)

*Primary Examiner*—Nguyen Vo
*Attorney, Agent, or Firm*—Fenwick & West LLP

[57] ABSTRACT

A wireless communication system automatically aligns a magnetic induction field to establish a two-way communication link between a stationary base unit located, for example, at a user's work station, and a remote unit worn by the user, for example, as a headset or body pack. At any point in time, the base unit and the remote unit have an arbitrary relative orientation to each other. The base unit senses this orientation, then aligns the magnetic induction field to maintain the communication link with the remote unit. In one embodiment, the base unit preferably includes an aerial array having a number of mutually orthogonal windings. Each winding produces a signal when a magnetic induction field generated by the remote unit passes through the base unit. A selector module selects the longitudinal axis of the winding with the strongest signal as an approximation of a direction vector defining the orientation of the magnetic induction field relative to the base unit. In another embodiment, the base unit preferably includes an aerial array comprising three orthogonal windings disposed about a spherical core. A selector module selects one or more windings for transmitting a magnetic field that rotates in a plane orthogonal, i.e., "crossed field," to the direction vector defining the orientation of the received field relative to the base unit.

16 Claims, 17 Drawing Sheets

FOREIGN PATENT DOCUMENTS

| | | | |
|---|---|---|---|
| WO 97/08914 | 3/1997 | European Pat. Off. | H04Q 9/00 |
| 27 08 464 | 9/1977 | Germany | H04B 1/18 |
| 06253375 | 9/1993 | Japan | H04Q 9/00 |
| 06253375 | 9/1994 | Japan | H04Q 9/00 |
| 225901 | 2/1943 | Switzerland | 343/867 |
| 1164281 | 9/1969 | United Kingdom | H04B 5/00 |
| 21 232 14 | 1/1984 | United Kingdom | 343/867 |
| 21 557 36 | 9/1985 | United Kingdom | H04B 5/00 |
| 21 97 160 | 5/1988 | United Kingdom | H04B 5/02 |
| WO 96/37052 | 11/1996 | WIPO | H04B 5/02 |

BASE UNIT FOOTPRINT          REMOTE UNIT FOOTPRINT

NOTE:
AUXILIARY FIELD
IS ANTIPHASE TO
MAIN FIELD

TRANSMIT ARRAY    RECEIVE AERIAL

TRANSMIT ARRAY    RECEIVE AERIAL

ALL CURRENT IN COIL B

EQUAL CURRENT IN
BOTH COILS

VECTOR MEASURING AERIAL ARRAYS FOR MAGNETIC INDUCTION COMMUNICATION SYSTEMS

CROSS-REFERENCE TO RELATED APPLICATIONS

This application is a continuation-in-part of application Ser. No. 08/742,337, filed on Nov. 1, 1996, for "Aerial Arrays for Inductive Communication Systems." U.S. Pat. No. 5,966,641.

FIELD OF THE INVENTION

This invention relates to aerial arrays for wireless communication systems, and more particularly to aerial arrays that automatically align a magnetic induction field to establish a communication link.

BACKGROUND OF THE INVENTION

In local wireless communication systems, such as telephone systems, a base station communicates voice data between a telephone line and a remote unit, such as a headset, worn by a user. These conventional systems typically transmit data from the base station over a wide area adjacent to the base station. Moreover, these systems typically use ultrasound, radio frequency (RF), or infrared carrier signals to transmit data between transmitters and receivers in the base and remote units. These carrier signals are subject to "scattering" and may interfere with other nearby transmitters and receivers.

In addition, ultrasonic and infrared systems require a line-of-sight communication channel between transmitters and receivers which may limit their usefulness for certain short range applications. Likewise, the usefulness of RF systems for certain short range applications may be limited by a "1/r" signal decay rate, where "r" is the effective range of the transmitted RF signal.

Magnetic Induction (MI) communication systems have been used in commercial applications, such as audio loops in buildings, direct speech communication through security screens, and low-rate data links between underground equipment and surface equipment. The security screens typically include coils built into fixed desk mats on both sides of the screen. These systems have a short transmission range, thus making them more suitable for certain short range applications than their RF counterpart, but do not allow movement of one mat relative to the other.

One type of MI system provides a user with a telephone headset connected to a remote unit. The remote unit communicates with a stationary base unit at the user's desk. In such an environment, the user can move about within their workspace, resulting in an arbitrary orientation (i.e., height, distance, and angle) between the base unit and the remote unit that changes over time. It is desirable that such a system allow the user to move within a work area around the work station without a loss of, or a break in, the communication link due to such changes in orientation. It is also desirable that such a system be simple and inexpensive to implement.

Accordingly, there is a need for a simple and inexpensive wireless communication system that establishes and maintains a communication link between a base unit and a remote unit having a relative orientation to each other that changes over time.

SUMMARY OF THE INVENTION

The present invention is directed to a wireless communication system that automatically aligns a magnetic induction field to establish a two-way communication link between a stationary base unit and a remote unit worn by the user, for example, as a headset or body pack. When the user moves within their work area, a first aerial in the base unit and a second aerial in the remote unit have an arbitrary relative orientation to each other. The base unit senses this orientation, then aligns the magnetic induction field to maintain an optimum coupling between the first aerial and the second aerial in the base unit and the remote unit, respectively.

The complexity of duplex filtering associated with maintaining the communication link is reduced by arranging the aerials in the base unit and the remote unit to have zero mutual inductance rather than build conventional duplex filters which can be bulky at the frequencies used for MI. While the remote unit preferably uses a simple aerial (e.g., single-axis aerial), the base unit uses a multi-axis aerial because it is responsible for maintaining the integrity of the communication link by automatically aligning the magnetic induction field for maintaining a two-way communication link with the remote unit.

In one embodiment of the present invention, a remote unit preferably includes a single-axis aerial that generates a first quasi-static magnetic induction field for communicating with a base unit. The base unit preferably includes a multi-axis aerial array having a number of mutually orthogonal windings wound around a single permeable core or, alternatively, a number of mutually orthogonal single-axis aerials, each having a single winding on a separate permeable core. Each winding produces a signal when a first magnetic induction field generated by the remote unit passes through the multi-axis aerial array in the base unit. The signal strength in each winding is a measure of a component of a direction vector along the longitudinal axis of that winding that defines the orientation of the first magnetic induction field relative to the multi-axis aerial array in the base unit.

More particularly, when the first magnetic induction field passes through the base unit, a voltage is induced in each winding. The voltage in each winding is a measure of the strength of the first component of the first magnetic induction field along the longitudinal axis of that winding. A transmission drive is then applied to each winding that is proportional to the voltage in that winding, thus aligning the second magnetic induction field with the first magnetic induction field. This alignment of the first and second magnetic induction fields establishes a two-way communication link with the remote unit, thus allowing communication signals to be transmitted back to the remote unit.

In another embodiment of the present invention, the longitudinal axis of the winding in the base unit receiving the strongest signal (i.e., having the greatest induced voltage) is taken as an approximation to the direction vector of the first magnetic induction field generated by the remote unit. Upon selection of that winding by a selector module, a transmission drive proportional to the received signal is applied to the same winding, or a winding co-axial to such winding, to generate the second field for establishing the communication link with the remote unit.

In another embodiment of the present invention, the base unit and the remote unit communicate using a "crossed field" system. The base unit preferably includes an multi-axis aerial array comprising three mutually orthogonal windings wound on a spherical, permeable core. In this embodiment, a transmission drive is applied to the windings for generating a second magnetic induction field that rotates in a plane orthogonal to the direction vector defining the orientation of the first magnetic induction field relative to the multi-axis aerial array in the base unit. This "crossed field" induces in the remote unit a voltage in a winding disposed about a receive aerial (e.g., solenoid aerial) located proximate to and orthogonal with a transmit aerial in the remote unit, thus forming a communication link between the base unit and the remote unit.

Aerial arrays that are made in accordance with the present invention maintain a two-way MI communication link between a base unit and a remote unit having a relative orientation to each other that changes over time as the user moves in their work space. The windings in these aerials are arranged to have near zero mutual inductance, thus reducing the need for complex duplex filtering. These aerial arrays provide a simple and inexpensive implementation.

DESCRIPTION OF THE PREFERRED EMBODIMENTS

Figure 1:
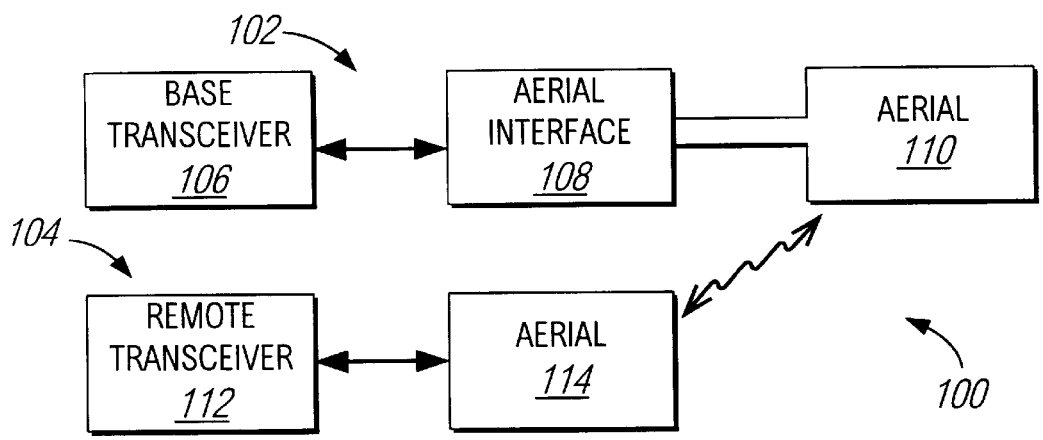
FIG. 1 is a block diagram of one embodiment of a MI communication system in accordance with the subject matter of the invention.

Referring to FIG. 1, there is shown a block diagram of an inductive communication system 100. The communication system 100 includes a base unit 102 and a remote unit 104 that communicate over a short range through a magnetic induction link. The communication system 100 may be, for example, a telephone that includes a wireless communication link between the base unit 102 at a user workstation and the remote unit 104, which is part of an audio headset or body pack worn by an operator. A plurality of communication systems 100 may be used, for example, in an office environment.

The base unit 102 includes a base transceiver 106, an aerial interface 108, and a base aerial 110. The base aerial 110 generates a first magnetic induction field for communicating data from the base unit 102 to the remote unit 104 and receives a second magnetic induction field from the remote unit 104. The base unit 102, or only some elements of the base unit 102 (such as the base aerial 110), may be, for example, disposed on or in a desk surface, on a floor mat, in a bench mat, or inside a keyboard. The base aerial 110 may be shaped to the desk, floor mat or the like. For example, for an "L" or "U" shaped desk, the base aerial 110 may be extended around the corners and along the length of the desk, or alternatively, an additional loop may be added to the base aerial 110.

The base aerial 110 is, preferably, an air core, rectangular loop aerial with a length substantially greater than the width. For telephone headsets, the "very near field effects" of the rectangular loop can be realized if the length of the base aerial 110 is approximately ten times the width of the base aerial 110, and the height of the base aerial 110 is approximately ten times the depth of the base aerial 110.

The remote unit 104 includes a remote transceiver 112 and a remote aerial 114. The remote aerial 114 generates the second magnetic induction field for communicating data from the remote unit 104 to the base unit 102 and receives the first magnetic induction field from the base aerial 110.

For an aerial where the Biot-Savart law applies (i.e. a quasi static field away from a conductive medium), several important observations are made. First, if the distance between two aerials is much less than the length of the aerials, the strength of the magnetic field generated between the aerials varies linearly with distance. Second, when the distance between two aerials is comparable to the lengths of the aerials, the strength of the magnetic field falls off inversely with the square of the distance. Lastly, when the distance between the aerials is significantly longer than the lengths of the aerials, the strength of the magnetic field falls off inversely with the cube of the distance. Thus, by adjusting the aerial dimensions and/or adjusting the driving current supplied by a transceiver, the aerial footprints (i.e., the area defined by a line of equipotential having a field strength indicative of the operation of the system), can be controlled. By controlling the shape of the aerial footprint, closer spacing of remote units in a multiple-user environment can be achieved, thus reducing the demand on frequency spectrum allocation.

It is noted that the precise decay law is also frequency dependent, especially for distances much larger than the aerial dimensions. The above-description, however, is sufficient to describe the nature and the benefits of the invention.

For example, assume that the base aerial 110 lies parallel to the front of a desk. As the user moves along the front of the desk, the user moves parallel to the long axis of the base aerial 110 and remains in a magnetic inductive field of substantially constant strength. The quality of the communication over the link is maintained in this dimension by extending the length of the rectangular loop of the base aerial 110. Alternatively, the base aerial 110 is a single loop air core conductor that may be shaped to conform to a workstation and integrated with the workstation, or a desk on which the work station rests. This embodiment allows the range of the aerial to be extended without increasing the drive power from the base transceiver 106.

Figure 2:
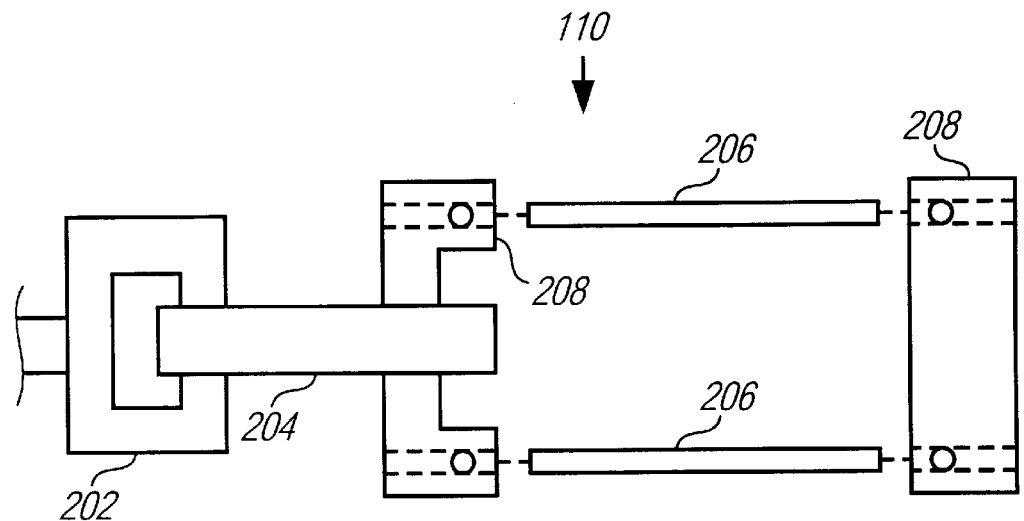
FIG. 2 is a block diagram of one embodiment of an aerial interface of the communication system of FIG. 1 in accordance with the subject matter of the invention.

Referring to FIG. 2, there is shown a block diagram illustrating one embodiment of the aerial interface 108 and the base aerial 110 of the communication system 100. The aerial interface 108 includes a drive coil 202 and a permeable core 204. The base aerial 110 includes rods 206 and blocks 208. The drive coil 202, permeable core 204, and base aerial 110 constitute a transformer with a short-circuited, single-turn secondary. The drive coil 202 may be disposed adjacent a drive module (not shown) in the aerial interface 108 or may be disposed remote from the drive module and connected by a cable (not shown). The drive coil 202 receives a current containing the data to be communicated from the base transceiver 106 and generates a field which is inductively coupled through the permeable core 204 to the base aerial 110. One embodiment of the base aerial 110 may be constructed with, for example, rods 206 formed from conductive material, such as aluminum, which are inserted into holes in blocks 208 also formed from conductive material, such as aluminum. Alternatively, the base aerial 110 may be formed, for example, of self adhesive foil or self adhesive flexible printed circuit board. The shape of the base aerial 110 may be altered to conform with the physical shape of the workstation. By forming the loop of a flexible material, the shape of the loop may be formed at the time of installation.

Figure 3:
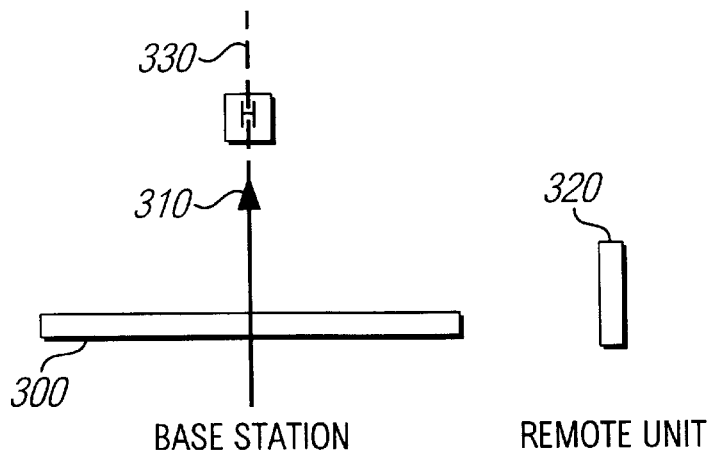
FIG. 3 is a side view of a vertical field configuration of aerials in accordance with the subject matter of the invention.

Referring to FIG. 3, there is shown a side view of one embodiment of a vertical field configuration of aerials in accordance with the present invention. The configuration includes an air core loop aerial 300 in the base unit 102 and a permeable core solenoid aerial 320 in the remote unit 104. The loop aerial 300 is perpendicular to the view shown and has a major axis in the horizontal plane. The loop aerial 300 generates magnetic flux lines defined by a magnetic flux vector 310 ("H") that extend through the center of the loop aerial 300. Although not shown for simplicity, the magnetic flux lines generated by the loop aerial 300 close on themselves.

The windings of the solenoid aerial 320 are disposed about its longitudinal axis. When the longitudinal axis of the solenoid aerial 320 is parallel to a center axis 330 of the loop aerial 300, the coupling between the solenoid aerial 320 and the loop aerial 300 is maximized. As the longitudinal axis of the solenoid aerial 320 is rotated, the strength of the magnetic coupling between the aerials approaches zero when the longitudinal axis of the solenoid aerial 320 is perpendicular to the center axis 330 of the loop aerial 300. Similarly, as the solenoid aerial 320 is elevated above or lowered below the plane of the loop aerial 300, the strength of the magnetic coupling between the aerials is reduced. Such coupling is analogous to a vertically polarized RF system.

Figure 4:
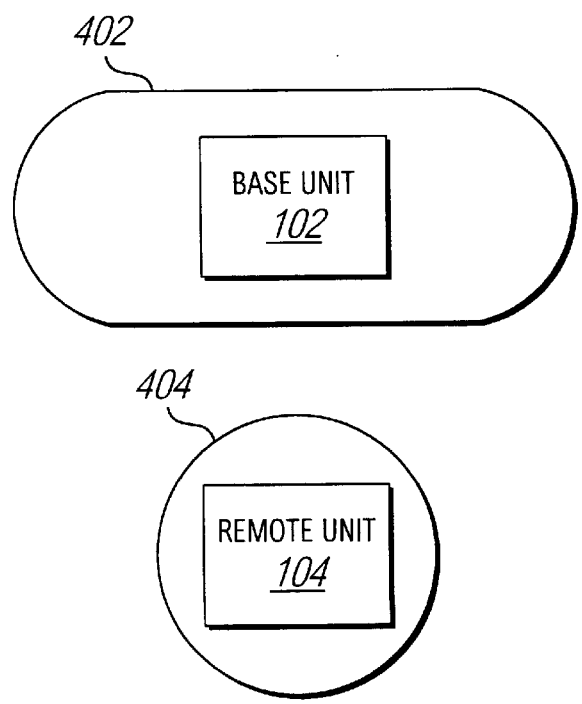
FIG. 4 is a top plan view illustrating the response areas for the base unit and the remote unit of FIG. 1.

Referring to FIG. 4, there is shown a top plan view of the response area, i.e., footprint, for the base unit 102 and the remote unit 104 of FIG. 1. The base unit 102 including a loop aerial 300 has a response area 402 that is elongated. The remote unit 104 including a solenoid aerial 320 has a response area 404 that is circular. As discussed previously, by controlling the shapes of these aerial footprints, closer spacing of remote units in a multiple-user environment can be achieved, thus reducing the demand on frequency spectrum allocation.

Figure 5:
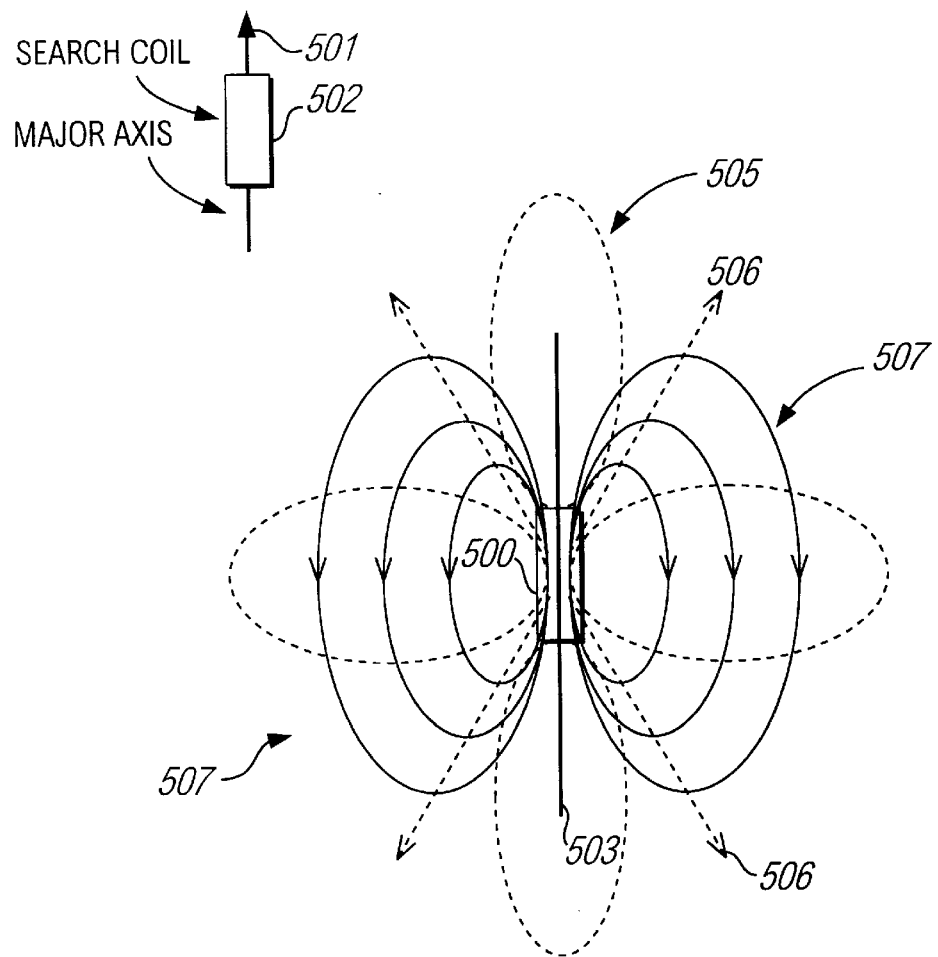
FIG. 5 is a side view illustrating the magnetic flux lines and null lines of a solenoid aerial.

Referring to FIG. 5, there is shown a side view of one embodiment of the invention including a transmitting solenoid aerial 500 and a search coil 502. The search coil has a major axis 501 parallel to the longitudinal axis 503 of the solenoid aerial 500. The solenoid aerial 500 has lines 505 joining points of constant induced voltage in the search coil 502 that extend from the solenoid aerial 500 and have peaks in a plane perpendicular to the longitudinal axis of the solenoid aerial 500 and peaks that have a maximum along the longitudinal axis 503 of the solenoid aerial 500. The lines 505 of constant voltage have null lines 506 that are along conical surfaces that are approximately 45 degrees to the longitudinal axis of the solenoid aerial 500. The solenoid aerial 500 also has magnetic flux lines 507 that extend through the solenoid aerial 500 and close on themselves.

Figure 6:
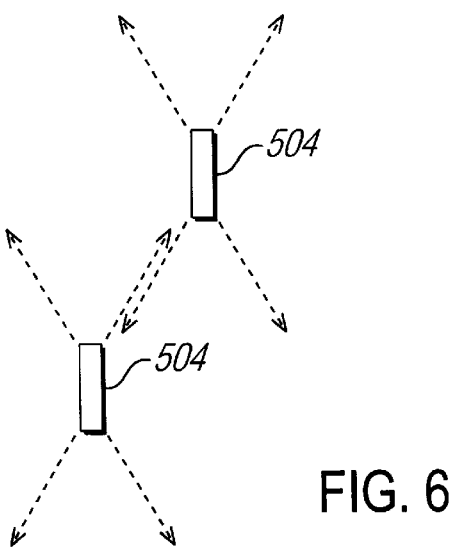
FIG. 6 is a side view illustrating the mutual nulling of a pair of solenoid aerials.

Referring to FIG. 6, there is shown a pair of solenoid aerials 504 having mutual null lines that are approximately aligned. A system that uses the same aerial for transmitting and receiving typically has a complex duplex filter at the receiver input. This complexity, however, may be reduced by employing a pair of parallel solenoid aerials 504, where one aerial is used to transmit and the other aerial is used to receive. The aerials 504 can be used in the remote unit 104 (e.g., headset, body pack). These solenoid aerials 504 are null coupled to provide isolation between the transmit signals and the receive signals, thus preventing interference between aerials. This embodiment eliminates the need for filtering the high level transmit signal that would otherwise couple to the receive aerial.

Figure 7:
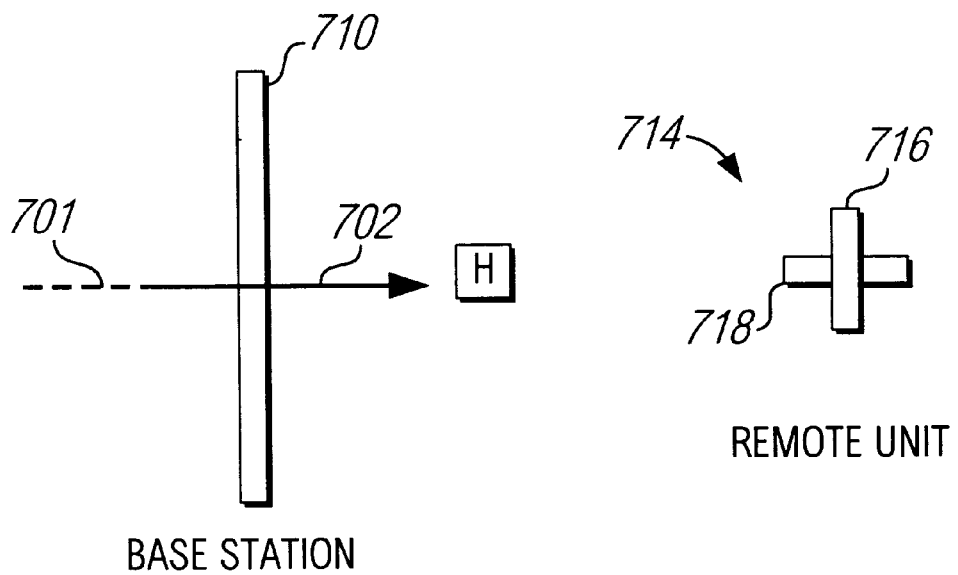
FIG. 7 is a side view of a horizontal field configuration of aerials in accordance with the present invention.

Referring to FIG. 7, there is shown a side view of one embodiment of a horizontal field configuration of aerials in accordance with the subject matter of the invention. The configuration includes an air core loop aerial 710 in the base unit 102 and a crossed aerial 714 in the remote unit 104. The loop aerial 710 is perpendicular to the view shown and has a central axis 701 in the vertical plane. The loop aerial 710 generates a plurality of magnetic flux lines defined by the magnetic flux vector 702 ("H") that extend through the center of the loop aerial 710. Although not shown for simplicity, the magnetic flux lines generated by the loop aerial 710 close on themselves.

The crossed aerial 714 includes first and second solenoid aerials 716 and 718, which are perpendicular to each other. Specifically, the solenoid aerials 716 and 718 include a ferrite permeable core and loops (not shown) disposed on the permeable core that are perpendicular to the longitudinal axis of the solenoid aerials 716 and 718. When the longitudinal axis of the solenoid aerial 718 is parallel to the center axis 701 of the loop aerial 710 and the solenoid aerial 718 is in the same horizontal plane as the loop aerial 710, the coupling between the solenoid aerial 718 and the loop aerial 710 is maximized. As the solenoid aerial 718 rotates, and thus as the longitudinal axis of the crossed aerial 714 rotates, the strength of the magnetic coupling approaches zero when the longitudinal axis of the solenoid aerial 718 is perpendicular to the center axis 701 of the loop aerial 710. The coupling of the solenoid aerial 716 functions in the reverse direction with the coupling increasing from zero to maximum coupling during the 90 degree rotation. Furthermore, as the solenoid aerial 718 is elevated above or lowered below the plane of the loop aerial 710, the coupling between the solenoid aerial 718 and the loop aerial 710 is reduced. Such coupling of the solenoid aerial 716 is analogous to a horizontally polarized RF system.

The crossed aerial 714 preferably is used in applications in which it is necessary to avoid the nulls of the aerial, which are in a line at about 45 degrees from the major axis by the geometry of FIG. 6, and where it is necessary to avoid the nulls that occur, the null by the mechanism just described if the user rotates, for example, in a swivel chair.

The signals received by the solenoid aerials 716 and 718 preferably are summed vectorally and provided to the remote transceiver 112 of the remote unit 104 in FIG. 1. Alternatively, the remote transceiver 112 of the remote unit 104 may process the signal from the solenoid aerials 716 and 718 having the greatest magnitude.

The crossed aerial 714 receives a signal having a strength that is theoretically twice the strength of the signal received by the aerial 320 (FIG. 3). By design, the crossed aerial 714 also has twice the sensitivity. Thus, the crossed aerial 714 provides a 12 dB signal advantage over the aerial 320. In some applications, this increased performance would justify the extra complexity of combining the signals from 716 to 718.

Figure 8:
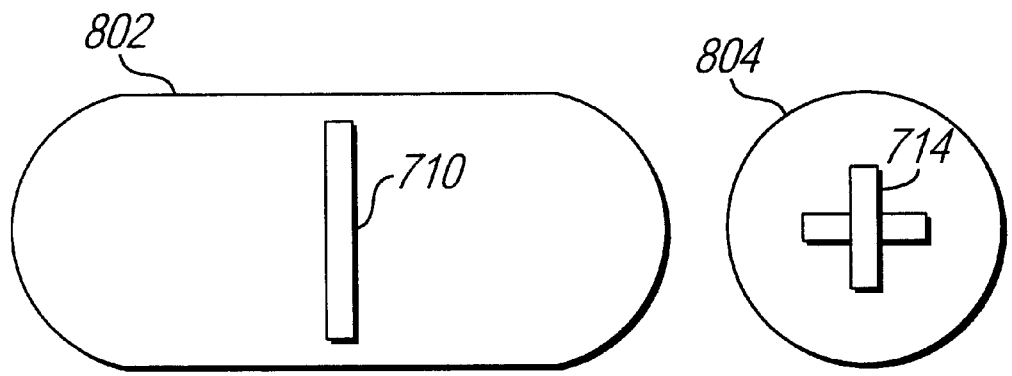
FIG. 8 is a top plan view illustrating the response area for the base unit and the remote unit of FIG. 7.

In a horizontal magnetic field system as shown in FIGS. 7 and 8, if the range of the fields behind the base unit 102 encroaches an area required by another system, the aerial 710 may be tilted so that the field behind the base unit 102 is directed downward toward the floor to reduce such encroachment.

In a vertical magnetic field system as shown in FIGS. 3 and 4, the base aerial 300 of the base unit 102 may be rotated slightly about the major axis to avoid the geometry described above in conjunction with FIG. 6, such as may occur when the user stands up.

Referring to FIG. 8, there is shown a top plan view illustrating the response area for the base unit 102 including the aerial 710 and the remote unit 104 including the crossed aerial 714. The base unit 102 has a response area 802 that is elongated. The remote unit 104 has a response area 804 that is circular.

Figure 9A:
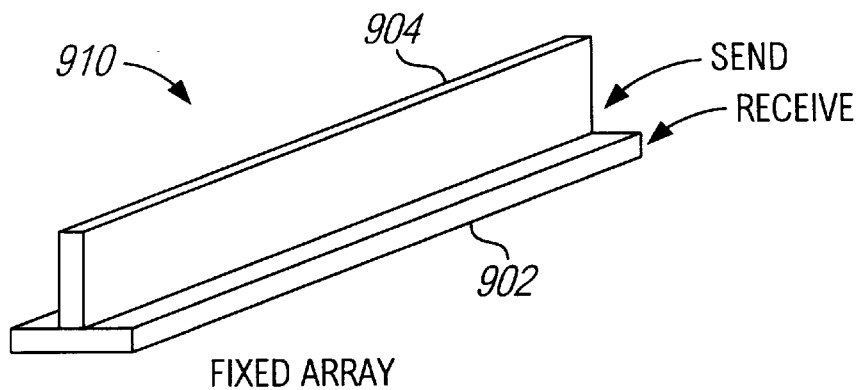
FIG. 9a is a partial perspective view of one embodiment of a fixed aerial array in accordance with the present invention.
Figure 9B:
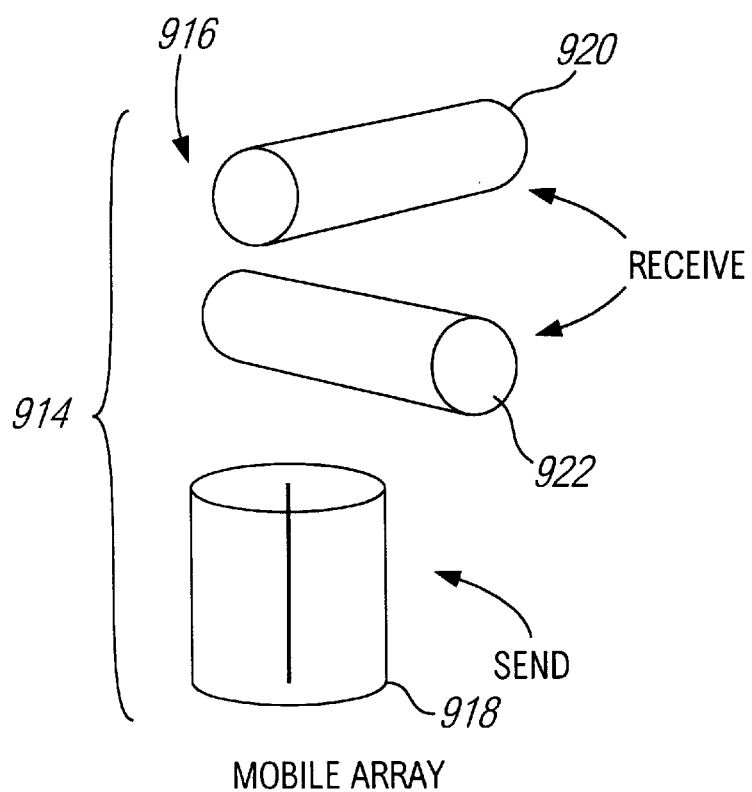
FIG. 9b is an exploded view of one embodiment of a mobile aerial array in accordance with the present invention.

Referring to FIGS. 9a and 9b, there is shown a partial perspective view of the fixed aerial array 910 and an exploded view of a mobile aerial array 914, respectively. The fixed aerial array 910 generates a magnetic inductive field having a first orientation (e.g., horizontal) for transmissions and receives a magnetic inductive field having a second orientation (e.g., vertical) that is orthogonal to the first orientation. The fixed aerial array 910 includes a receive aerial 902 having a loop shape, such as described above for the loop aerials 300 and 710 (FIGS. 3 and 7) and having a rectangular transverse cross section. The fixed aerial array 910 also includes a transmit aerial 904 having a loop shape and having a rectangular transverse cross section. The shorter surface of the transmit aerial 904 is disposed on the longer surface of the receive aerial 902 to form a T-shape transverse cross section. The mutual inductance between the receive aerial 902 and the transmit aerial 904 is low, ideally zero. This provides a second, preferred method for isolating transmitted signals from the receiver input and reducing the demands on input filters with associated savings in cost and power consumption.

The mobile aerial array 914 generates a magnetic inductive field having a first orientation (e.g., vertical) for transmissions and receives a magnetic inductive field having a second orientation (e.g., horizontal) that is orthogonal to the first orientation. The mobile aerial array 914 includes a crossed horizontal aerial 916 for receiving and a vertical aerial 918 for transmitting. The cross horizontal aerial 916 includes a first solenoid aerial 920 and a second solenoid aerial 922 perpendicular to the first solenoid 920. The solenoid aerials 920 and 922 are similar to the solenoid aerials 716 and 718 described above in conjunction with FIG. 7. Specifically, the solenoid aerials 920 and 922 include a ferrite permeable core and loops disposed on the ferrite core (not shown). The vertical aerial 918 may be, for example, a solenoid aerial similar to solenoid aerials 920 and 922.

Various embodiments for the remote aerial 114 of the remote unit 104 are now described. In a remote unit that is used as a user telephone headset, the remote aerial 114 preferably is compact and light weight. As a development of the mobile aerial array 914, the remote aerial 114 preferably includes dual or triple axis aerials disposed on a single permeable core to provide sensitivity and frequency response that is matched for each aerial. A tri-axis aerial may be formed by combining three single axis aerials as in the mobile aerial array 914, a single axis aerial with a dual-axis aerial, or three windings on a single permeable core.

Figures 10A, 10B:
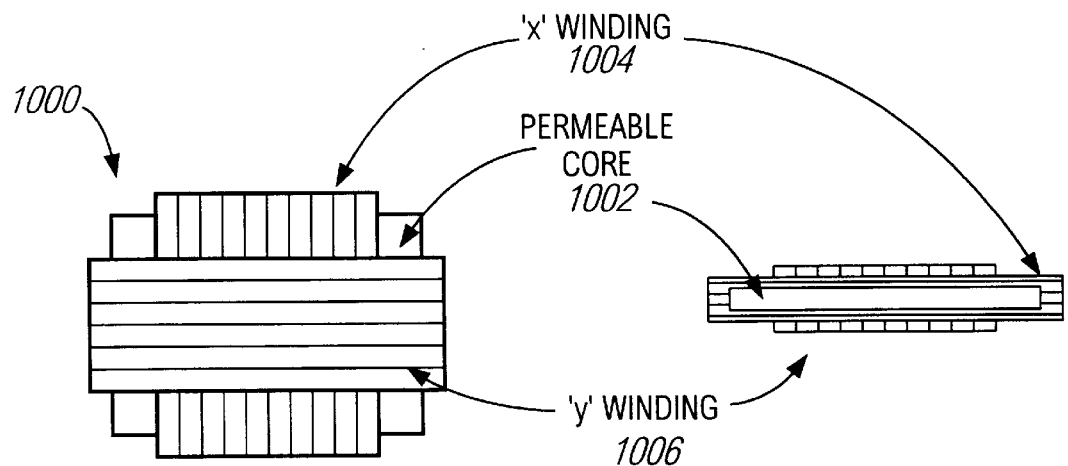
FIGS. 10a and 10b are top and side plan views, respectively, of one embodiment of an aerial array for a remote unit in accordance with the present invention.

Referring to FIGS. 10*a* and 10*b*, there is shown top and side cross-sectional views, respectively, of a dual-axis aerial array 1000 for the remote unit 104 in accordance with one embodiment of the invention. The dual-axis aerial array 1000 includes a permeable core 1002 and first and second windings 1004 and 1006. The permeable core 1002 is box shaped and formed of ferrite. The first winding 1004 is disposed on the surface of the core 1002 in a first plane. The second winding 1006 is disposed in a second plane perpendicular to the first plane. The windings 1004 and 1006 are oriented to minimize mutual inductance. The physical construction of the windings 1004 and 1006 provide this minimization which negates any need for additional mechanical fixing or adjustment, for nulling. In most applications, such a structure is therefore described as self-nulling. The dimensions of the core 1002 are selected so that the windings 1004 and 1006 have substantially identical inductance and capacitance.

Figures 11A, 11B:
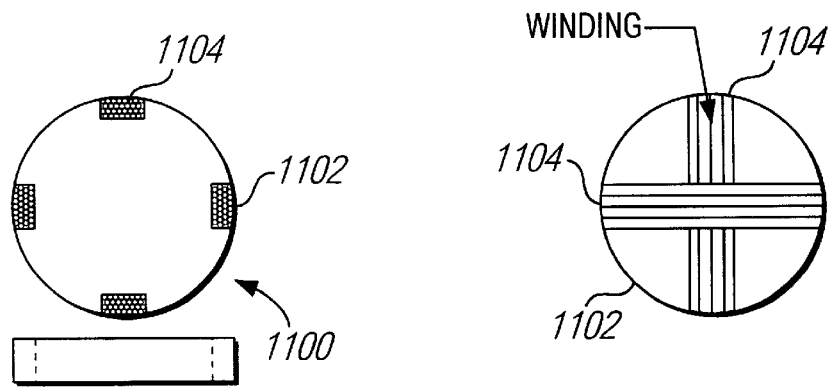
FIGS. 11a–11b are transverse cross-sectional and top plan views, respectively, of an aerial array for a remote unit in accordance with the present invention.

Referring to FIGS. 11*a*–11*b*, there are shown cross sectional and top plan views, respectively, of a magnetic inductive aerial 1100 in accordance with another embodiment of the present invention. The aerial 1100 includes a permeable core 1102 and first and second windings 1104 and 1106, respectively. The permeable core 1102 is disk-shaped and formed of ferrite. The first and second loops 1104 and 1106 are disposed in respective planes perpendicular to the flat surface of the permeable core 1102 and preferably perpendicular to each other. Flux enters and exits the permeable core 1102 perpendicular to the surface of the core 1102 (not shown). The round surfaces facilitate the capture and routing of flux through the loops 1104 and 1106, which allows the aerial 1100 to function better over angles of rotation of the remote unit 104. The flux in the core 1102 can be algebraically added to provide a similar result to other embodiments that apply vector addition to the outputs of dual-axis aerials. By eliminating the need for vector addition, this embodiment provides the same result as the other embodiments but with less complexity.

Alternatively, the permeable core may be ellipsoid shaped, and the first and second loops may be disposed in respective planes perpendicular to each other. Such a shaped core is less sensitive to rotation about an axis in the major plane.

Figure 12:
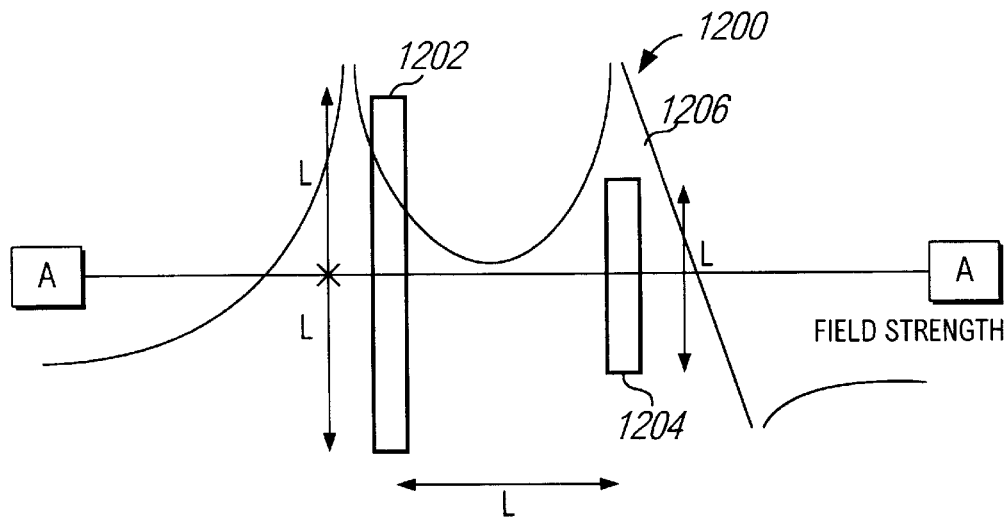
FIG. 12 is a top plan view illustrating the field strength of one embodiment of an aerial array in accordance with the present invention.

Referring to FIG. 12, there is shown a top plan view illustrating an aerial array 1200 in accordance with another embodiment of the present invention. The aerial array 1200 reduces the transmitted field and the receive sensitivity of a base unit 102 in an inductive communication system 100 in the area behind the aerial array 1200, and also reduces the field and sensitivity to the sides of the aerial array 1200. Accordingly, this allows units in multi-user communication systems to be spaced closer together to thereby reduce the required spectrum allocation of such systems for a given density of users. While the aerial array 1200 shown in FIG. 12 is configured to operate in a horizontal field (FIG. 7), the aerial array 1200 may also be configured to operate in a vertical field (FIG. 3).

The aerial array 1200 includes a main aerial 1202 and an auxiliary aerial 1204. The main aerial 1202 and the auxiliary aerial 1204 generate first and second magnetic inductive fields, respectively. Each aerial 1202 and 1204 of the aerial array 1200 preferably is one of the aerial arrays described in FIG. 9, such as the aerial arrays 910 and 914, which includes both transmit and receive aerials. The aerials 1202 and 1204 are preferably air core coils having a length that is significantly greater than the height. For example, the coil may be rectangular with the ratio of length to height at least five to one and a ratio of height to depth in the order of ten to one. The major axis of the aerials 1202 and 1204 are positioned in the horizontal plane and the flux in the center of these aerials is directed horizontally to provide maximum coupling to a horizontal solenoid aerial in the remote unit. The main aerial 1202 is spaced apart from the auxiliary aerial 1204 at a distance at which the sum of the first and second magnetic inductive fields is directional. The auxiliary aerial 1204 is shorter than the main aerial 1202 so that the field from the auxiliary aerial 1204 decays faster than the field from the main aerial 1202.

The auxiliary aerial 1204 is driven in antiphase to the main aerial 1202 to reverse the flux direction from the aerials and to draw in the fields to the sides of the main aerial 1202 and thereby produce a shaped or focused field for the array 1200. The field strength of the summed fields along the central axis A—A is shown as line 1206. Behind the aerial array 1200, the field from the auxiliary aerial 1204 substantially cancels the field from the main aerial 1202. The same configuration may be used as receiving array.

The outputs of the receive windings may be summed in antiphase to produce a null on the main axis behind the aerial array 1200. The relative gain between the two aerials may be varied to move the position of the null. The directed fields reduce interference between proximate systems. The aerial array 1200 may be shaped to conform to the workstation in a manner similar to the base aerial 110 in FIG. 1.

The aerial array 1200 allows the decay versus range profile of the base station 102 to be altered to conform to a desired area with optimal performance in the desired area and with significant reduction in signals outside this area. As the null behind the aerial array 1200 moves further behind the aerial array 1200, the near field increases and the far field decreases.

Figure 13A:
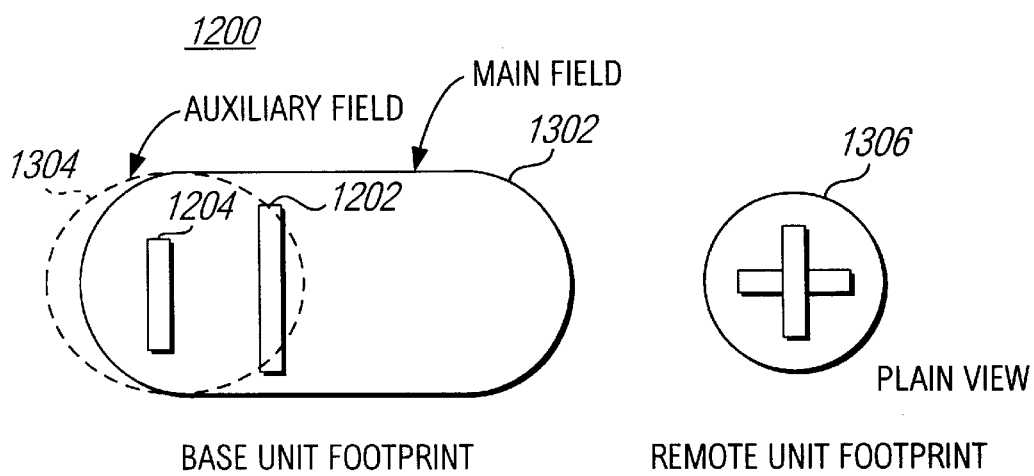
FIG. 13a is a top plan view illustrating the response area for a remote unit and a base unit that includes the aerial array of FIG. 12.

Referring to FIG. 13*a*, there is shown a top plan view illustrating the response area for a remote unit 104 and a base unit 102 that includes the aerial array 1200 of FIG. 12. The aerial 1202 has a response area 1302 that is elongated and extends out further in the front of the base unit 102 than the extension in the back of the base unit 102. The aerial 1204 has a response area 1304 that is elongated and that does not extend significantly beyond the aerial 1202 toward the front of the response area 1302. The remote unit 104 has a response area 1306 that is circular.

Figure 13B:
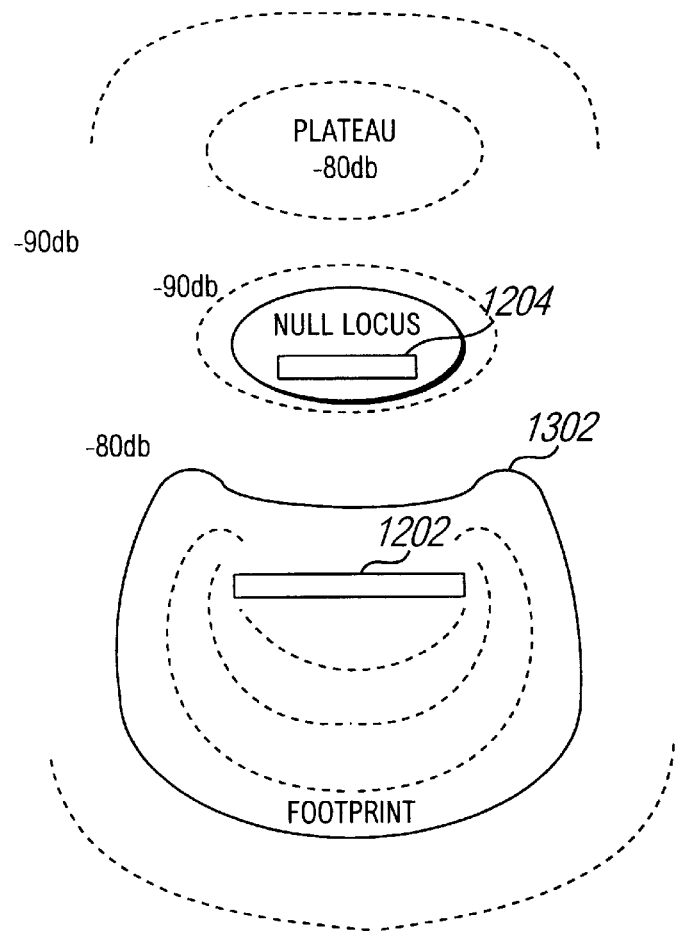
FIG. 13b is a top plan view illustrating the response area of the aerial array of FIG. 12 where the aerial array is driven in antiphase.

Referring to FIG. 13*b*, there is shown a top plan view illustrating the response area of the aerial array 1200 driven in antiphase. The aerial array 1200 provides a cardiod footprint 1302 when the aerials 1202 and 1204 are driven in antiphase. The fields generated from the aerials 1202 and 1204 cancel behind the aerial array 1200.

Figure 14:
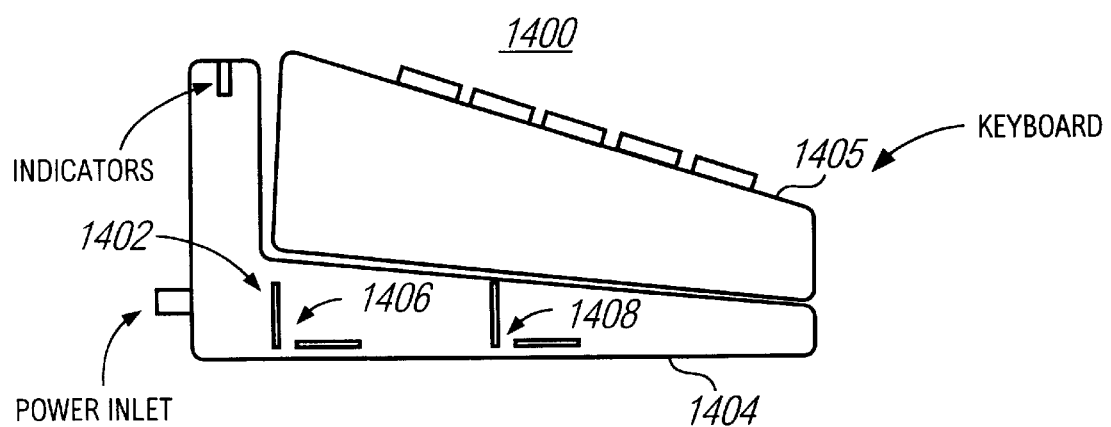
FIG. 14 is a cross-sectional view of a keyboard including the aerial array of FIG. 12 in accordance with the present invention.

Referring to FIG. 14, there is a cross-sectional view of one embodiment of a keyboard 1400 including an aerial array 1402 in accordance with the subject matter of the invention.

The keyboard 1400 includes the aerial array 1402, a base plate 1404, and a keypad 1405. The aerial array 1402 is disposed on the top surface of the base plate 1404 and below the keypad 1405. The aerial array 1402 includes a first pair of crossed aerials 1406 and a second pair of crossed aerials 1408. Each crossed aerial pair may be circuit traces disposed on the surface of a pair of printed circuit boards (not shown)

that are orthogonal to each other. Alternatively, the crossed aerials may be the fixed aerial array 910 in FIG. 9. The array 1402 may be tilted to direct the fields. Although FIG. 14 shows the keyboard 1400 as including only an aerial for the base unit 102, the keyboard 1400 may include other elements of the base unit 102.

Aerial arrays using steered rotating fields will now be described. Using steered rotating fields, the communication link of the inductive communication system 100 avoids the occurrence of orientations that produce zero mutual inductance or nulls between the fixed and movable aerials or aerial arrays. This allows common seating arrangement of users and provides a system capable of operation in which both units may move and have a random relative orientation.

By way of background, voltage is induced in a receiving aerial when it experiences a changing flux. The change may be produced by varying the magnitude or the direction of the incident field. Alternating the magnitude of a flux in a sinusoidal manner induces a sinusoidal voltage in the receiving aerial. Rotating the incident field at a constant rate will also induce a voltage. The frequency of the induced voltage is the same as the frequency of rotation of the field, which it can be shown is the same frequency as the frequency of the sinusoidal feed to the transmit array.

Referring now to FIGS. 15a, 15b, 15c and 15d, there are shown side views of the steered rotating field lines of a crossed aerial array 1500. The crossed aerial array 1500 includes a first aerial 1502 and a second aerial 1504, which are orthogonal to each other. A drive current is applied to the first aerial 1502. A drive current is applied to the second aerial 1504 that is 90 degrees phase shifted from the drive current applied to the first aerial 1502 and has the same waveform, to produce a rotating field.

Figure 15A:
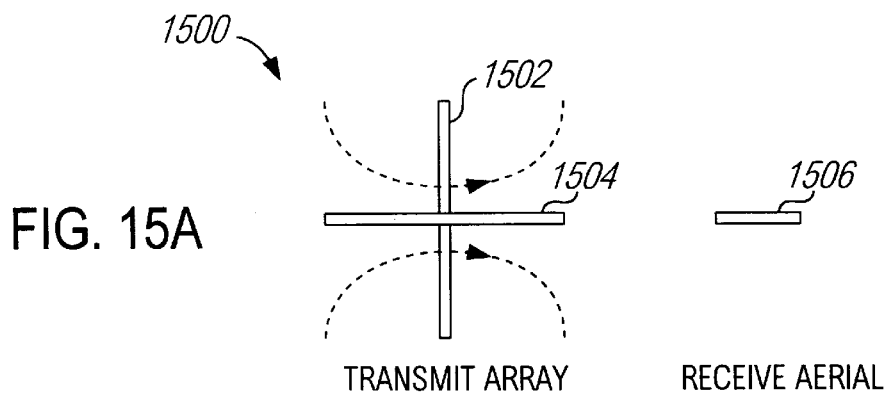
FIGS. 15a, 15b, 15c and 15d are side views of the steered rotating field lines of a crossed aerial array in accordance with the present invention.

Referring specifically to FIG. 15a, the drive current applied to the first aerial 1502 generates field lines extending perpendicular to the first aerial 1502 in the plane of the first aerial 1502. A solenoid receiver aerial 1506 only detects the vector component of field lines directed along the longitudinal axis of the solenoid receiver aerial 1506. Accordingly, a solenoid receiver aerial 1506 aligned with the field lines detects the maximum signal.

Figure 15B:
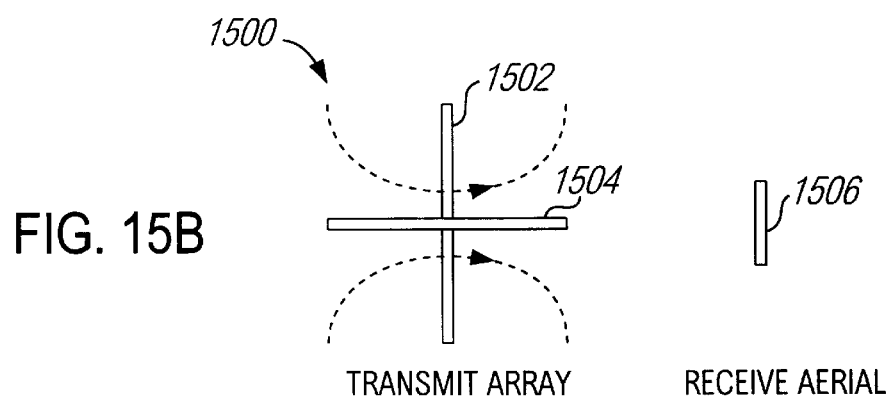

Referring specifically to FIG. 15b, the solenoid receiver aerial 1506 is rotated 90 degrees relative to the orientation of FIG. 15a. The solenoid receiver aerial 1506 is aligned perpendicular to the fields lines and detects the minimum signal from the first aerial 1502. If no current is applied to the second aerial 1504, the solenoid in this orientation is in a null of the first aerial 1502. If the second aerial 1504 were driven instead of the first aerial 1502, then the second aerial 1504 would experience maximum coupling to the field. The drive current applied to the second aerial 1504 generates field lines extending perpendicular to the second aerial 1504 in the plane of the second aerial 1504.

For a static field and with the orientation shown in FIG. 15b, the solenoid receiver aerial 1506 is in a null. On the other hand, for a rotating field, the aerial 1506 is in a null at one time, but has maximum coupling at another time so that voltage is induced in the receiver aerial 1506. A single axis aerial in the plane of rotation of a rotating field does not experience nulls.

Figure 15C:
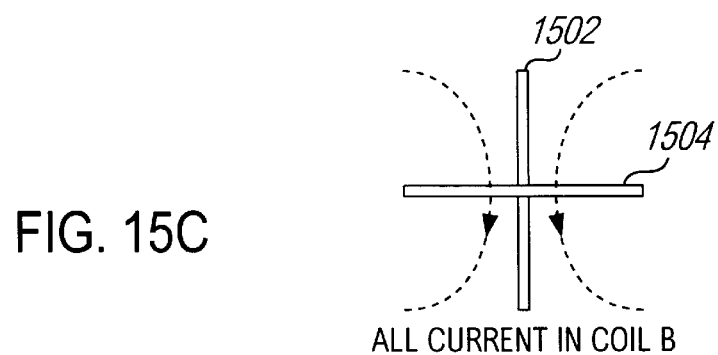

Referring specifically to FIG. 15c, the drive current applied to the second aerial 1504 generates field lines extending perpendicular to the second aerial 1504 in the plane of the second aerial 1504. A solenoid receiver aerial 1506 (not shown) oriented as in FIG. 15b is aligned with the field lines and detects the maximum signal. Conversely, a solenoid receiver aerial 1506 (not shown) oriented as in FIG. 15a is not aligned with the field lines and detects the minimum signal.

Figure 15D:
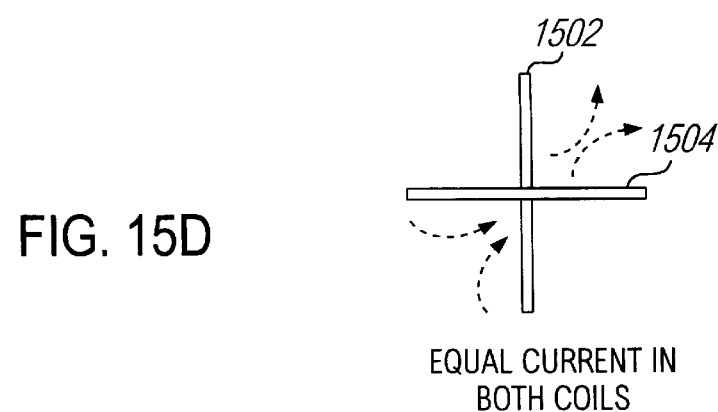

Referring specifically to FIG. 15d, if two alternating signals are provided in phase to the orthogonal aerials, the resultant field is the vector sum of the fields generated by each aerial and has a direction that is changeable by modulating the amplitudes of the fields.

Therefore, in a tri-axis aerial, feeding two windings of the tri-axis aerial creates a rotating field in the horizontal plane as described above in FIGS. 15a and 15b and feeding the third winding with a signal in-phase with one of the two aerials to keep the sum of the signals constant. This causes the plane of the rotating field to tilt.

Figure 16:
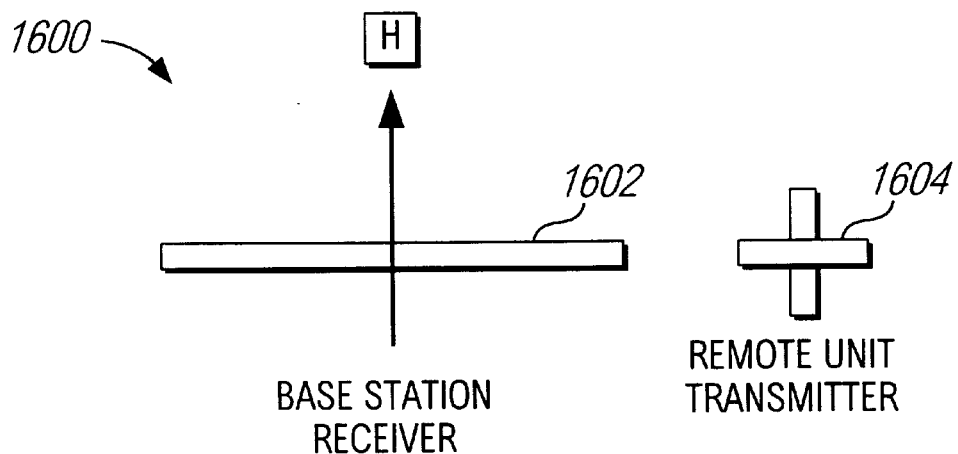
FIG. 16 is a side view of one embodiment of a vertical rotating field communication link in accordance with the present invention.

Referring to FIG. 16, there is shown a side view of a vertical rotating field communication link 1600 in accordance with the present invention. The vertical rotating field communication link 1600 includes a receive aerial 1602 in the base unit 102 and a crossed transmit aerial 1604 in the remote unit 104. The crossed transmit aerial 1604 provides a rotating field that rotates in the vertical plane as shown in FIG. 16. Such an aerial 1604 eliminates nulls from vertical displacement in the plane of the transmit and receive aerials. Accordingly, movement in a vertical direction, such as when a user stands up, or if the base unit 102 is on a desk and the user wears the remote unit 104 at chest height, does not cause the remote unit 104 to encounter a null. Thus, the vertical rotating field communication link 1600 provides an advantage over a vertical field system that lacks rotating fields, which avoids nulls in the horizontal plane but has the vertical displacement null problem.

Figure 17:
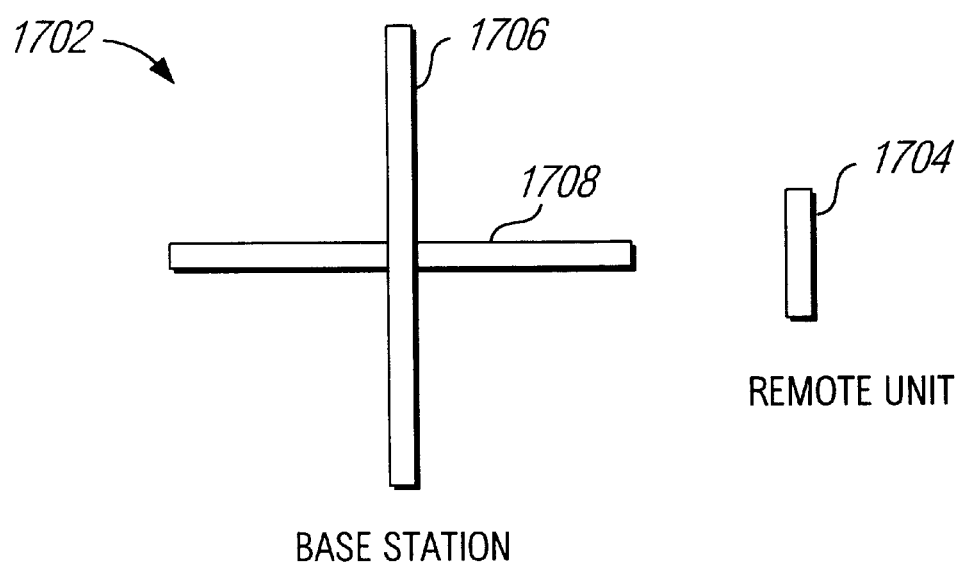
FIG. 17 is a top plan view of one embodiment of a horizontal rotating field communication link in accordance with the present invention.

Referring to FIG. 17, there is shown a top plan view of one embodiment of a horizontal rotating field communication link 1700 in accordance with the subject matter of the invention. The base unit 102 includes a crossed field aerial 1702. The remote unit 104 includes a single receive aerial 1704. The crossed field aerial 1702 includes a first aerial 1706 and a second aerial 1708 that is positioned perpendicular to the first aerial 1706. The cross field aerial 1702 provides a rotating magnetic field. By increasing the complexity and bulk of the base unit aerial in the base unit 102, the receive aerial in the remote unit 104 may be more compact and avoids the occurrence of nulls.

Figure 18:
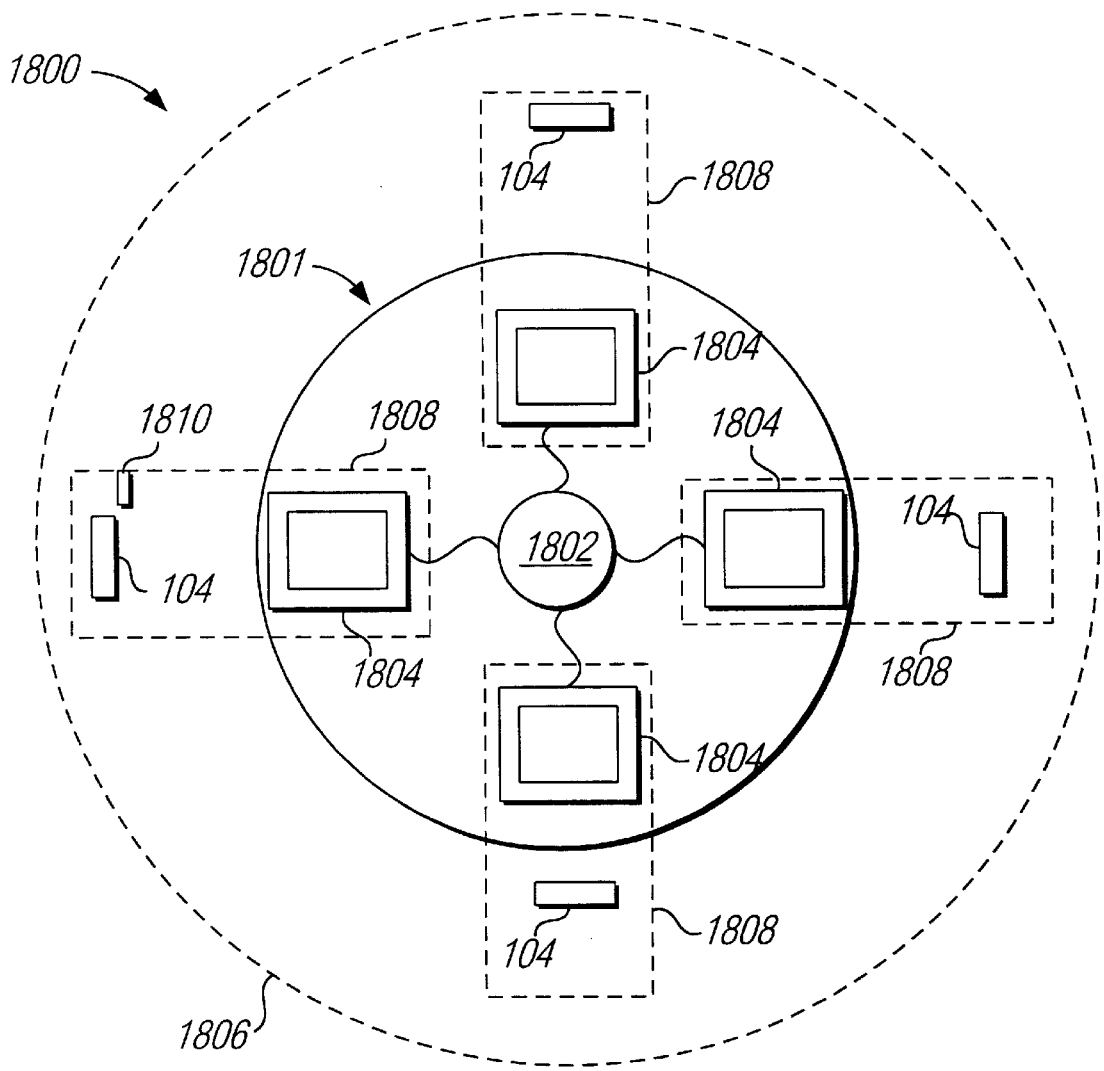
FIG. 18 is a top plan view of one embodiment of a communication cluster system in accordance with the present invention.

Referring to FIG. 18, there is shown a top plan view of a communication cluster system 1800 in accordance with the present invention. The communication cluster system 1800 includes a base unit 1801, a plurality of remote units 104, and a monitoring remote unit 1810. The base unit 1801 includes a central transmitter 1802 and a plurality of local receive aerials 1804. The central transmitter 1802 provides a first plurality of magnetic inductive fields over a first region 1806 adjacent the central transmitter 1802 to the remote units 104. Each of the first plurality of magnetic inductive fields preferably is a rotating horizontal field. Each field is generated at a different frequency and each remote is tuned to one appropriate frequency.

Each local receive aerial 1804 receives a magnetic inductive field from a remote unit 104 in a second region 1808 adjacent such local receive aerial 1804. In one preferred embodiment, the local receive aerial array 1804 receives magnetic inductive fields that are rotating vertical fields. Each second region 1808 may be smaller than the first region 1806. Each local receive aerial 1804 may have a directional footprint to increase performance in sensitivity and rejection of adjacent user signals. Each local receive aerial 1804 is located in an area adjacent a corresponding user. Such locations reduce the power required by the remote unit 104 to extend battery life of the remote unit 104 and to reduce interference between adjacent users.

The central transmitter 1802 includes, in a transmission designated for a remote unit 104, a code uniquely identifying such remote unit 104 in the first plurality of magnetic inductive fields.

The remote unit 104 transmits a field in a vertical plane and receives on a horizontal aerial. With this field orientation, the remote unit 104 in combination with the base unit 1801, which transmits a rotating horizontal field and receives on a vertical field, provide the user with freedom of movement around the communication cluster system 1800. The transmit and receive fields of the base unit 1801 and the remote unit 104 are decoupled.

The central transmitter 1802 simultaneously transmits the data to the remote units 104 in the first region 1806. Thus, all signals to the remote units 104 are available in the first region 1806. The communication with the plurality of user remote units 104 and the communication with the monitoring remote unit 1810 are each in a different frequency band. One of the plurality of local receive aerials 1804 communicates with corresponding user remote units 104 in the second region 1808 adjacent said one of the plurality of local receive aerials 1804 and selectively communicates with user remote units 104 with the monitoring remote unit 1810 in a second region 1808 adjacent any of the plurality of local receive aerials 1804. A supervisor may use the monitoring remote unit 1810 to selectively listen to the conversations of any operator while the supervisor is anywhere in the first region 1806 adjacent to the transmitter 1802. The supervisor may selectively monitor all communication made by the communication system 1800 without having to move to any particular portion of the first region 1806.

Figure 19A:
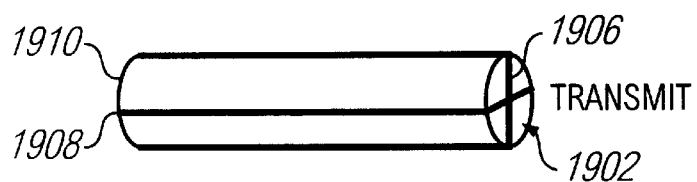
FIGS. 19a and 19b are views of one embodiment of a transmit aerial and a receive aerial, respectively, of a solenoid array in accordance with the present invention.
Figure 19B:
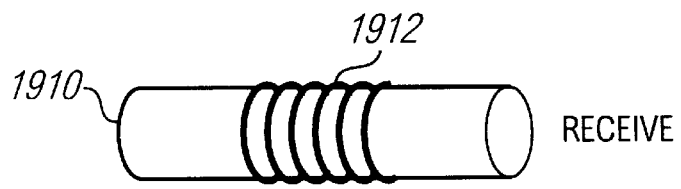

Referring to FIGS. 19a and 19b, there are shown views of a transmit aerial 1902 and a receive aerial 1904, respectively, of a solenoid array 1900. The transmit aerial 1902 includes first and second windings 1906 and 1908 disposed on the surface of a cylindrical core 1910. The first and second windings 1906 and 1908 are disposed in orthogonal planes that intersect along a longitudinal axis of the core 1910. The receive aerial 1904 includes a winding 1912 disposed along the surface of the core 1910 so that the central axis of the winding 1912 is substantially along the longitudinal axis of the core 1910. This provides a receive aerial 1904 that is orthogonal to the transmit aerial 1902 to minimize mutual coupling.

Figure 20:
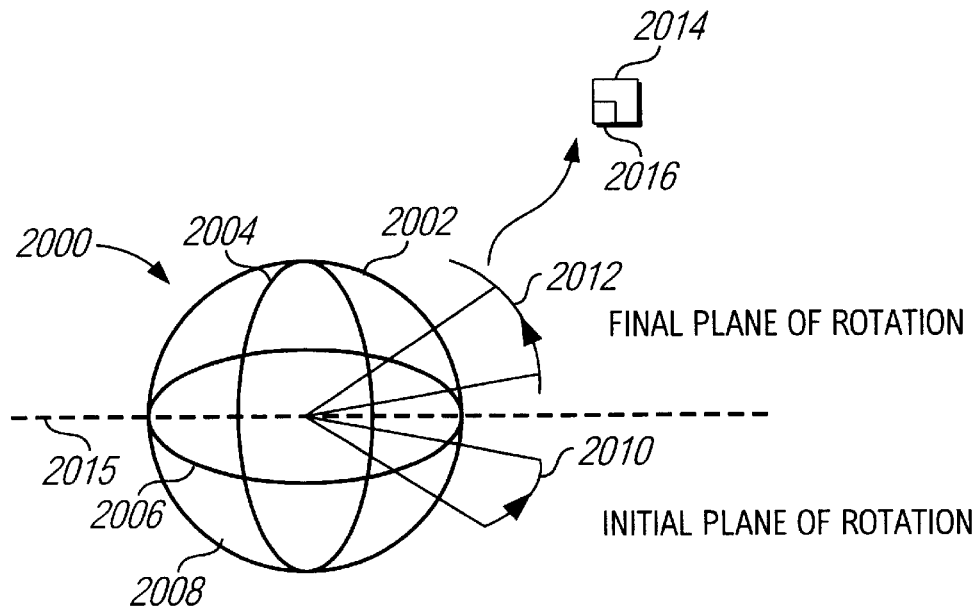
FIG. 20 is a diagram illustrating the geometry and tilting of a plane of rotation of one embodiment of a tri-axial transmitting antenna in accordance with the present invention.

Referring to FIG. 20, there is shown a diagram illustrating the geometry and tilting of a plane of rotation, respectively, of a tri-axial transmitting antenna 2000, which includes a first winding 2002, a second winding 2004, a third winding 2006, and a core 2008. Also, there is shown a remote unit 2014 including a receive aerial 2016.

The windings 2002, 2004, and 2006 are disposed in orthogonal planes on the surface of the core 2008. The tri-axial transmitting antenna 2000 generates a rotating field that is swept through all possible planes. The tri-axial transmitting antenna 2000 scans in space rather than frequency for the presence of a remote unit 2014 within the range of the tri-axial transmitting antenna 2000. As described above in conjunction with FIG. 15, the plane of the field may be tilted by applying current to the windings 2002, 2004, and 2006 in phase relative to each other. If driven with currents of equal amplitude and 90 degrees relative phase shift, the first windings 2002 and the second winding 2004 produce a field that rotates horizontally in a plane 2010 of the third winding 2006. If an increasing percentage of the current in the first winding 2002 is applied to the third winding 2006, such that the sum of the fields generated from aerials is constant, the plane of rotation is tilted until, when all the current is applied to the third winding 2006 and the current applied to the first winding 2002 is zero, the field rotates vertically in a plane 2012 of the first winding 2002. As shown in FIG. 20, the tilting of the plane is around an axis 2014 lying in a plane of the third winding 2006 linking the points where the first winding 2002 and the third winding 2006 intersect in such plane.

If the current is now progressively reapplied to the first winding 2002, but with reversed polarity, the plane of rotation continues in the same angular direction until the plane is once again horizontal, but having an opposite direction of rotation as the initial condition described above. The 180 degree amplitude modulation of the current applied to the first winding 2002 and the second winding 2006 causes the plane of rotation to sweep out a complete 360 degree volume of rotation.

For a receive aerial 2016 that is a dual-axis receive aerial, the remote unit 2014 may detect the plane of the received signal and then communicate back to the base unit 102. The base unit 102 may then tilt the plane of its field to maintain optimal coupling between the units. This eliminates the potential for vertical or rotational movement to create nulls in the response and also facilitates a power management system, such as the system 2000 described above, by minimizing transmission path losses.

If the receive aerial 2016 is a solenoid receiving aerial, the solenoid receiving aerial is oriented, during the sweeping process of the transmitting aerial 2000, with its longitudinal axis toward the center of the transmitting aerial 2000 for maximum coupling to the transmitted signal.

In one embodiment, the remote unit 2014 remains in a passive receive only mode unit the remote unit 2014 detects a search signal from the base unit 102. In this mode, the remote unit 2014 conserves power, which reduces power requirements and thus battery size. As the base unit 102 cycles through a scanning routine, at some time the transmitted signal achieves maximum coupling with the remote unit 2014. At such time, the plane of rotation is aligned with the remote unit 2014.

Figure 21A:
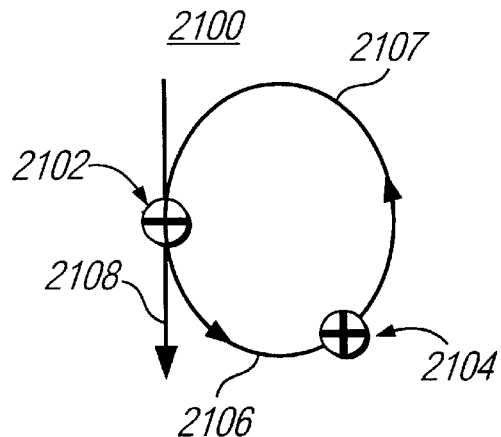
FIGS. 21a and 21b are top plan views of one embodiment of a vector measuring system in accordance with the present invention.
Figure 21B:
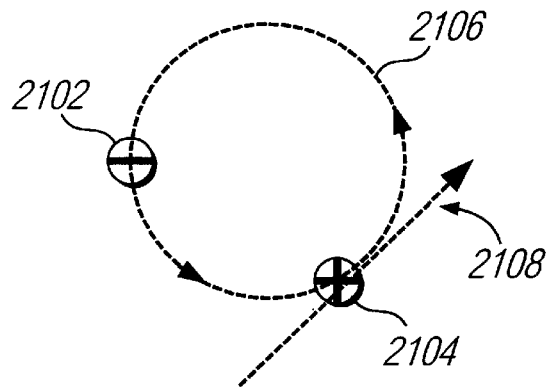
Figure 21C:
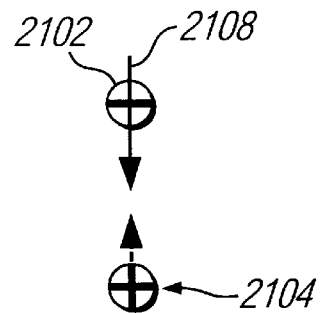
FIG. 21c is a top plan view illustrating an optimum coupling between a first aerial in the base unit 102 and a second aerial in the remote unit 104.

Referring to FIGS. 21a–21c, there is shown a wireless communication system that automatically aligns a magnetic induction field to establish a two-way communication link between a stationary base unit located, for example, at a user's work station, and a remote unit worn by the user, for example, as a headset or body pack. As the user moves within their work area, a first aerial in the base unit and a second aerial in the remote unit can assume an arbitrary relative orientation to each other. The base unit senses this orientation, then aligns the magnetic induction field to maintain an optimum coupling between the first aerial and the second aerial in the base unit and the remote unit, respectively.

The complexity of duplex filtering is reduced by arranging aerials in the base unit and the remote unit to have zero mutual inductance rather than build conventional duplex filters which can be bulky at the frequencies used for MI. While the remote unit preferably uses a simple aerial (e.g., single-axis aerial), the base unit includes a multi-axis aerial because it is responsible for maintaining the integrity of the communication link by automatically aligning the magnetic induction field for establishing or maintaining a two-way communication link with the remote unit.

In FIGS. 21a–21c, a vector measuring MI system 2100 preferably includes a remote unit 102 having a single-axis aerial 2102 and a base unit 104 having a multi-axis aerial array 2104. The single-axis aerial 2102 preferably transmits a quasi-static field from a single winding wound on a permeable core. Alternatively, the remote unit 104 includes a dual-axis aerial as previously described in conjunction with FIGS. 10 and 11.

The multi-axis aerial array 2104 of the base unit 102 preferably is a tri-axial aerial array having three mutually orthogonal windings as previously described in conjunction with FIGS. 9 and 20.

The single-axis aerial 2102 of the remote unit 104 generates a plurality of magnetic flux lines that follow a received flux path 2106 that passes through the multi-axis aerial array 2104 of the base unit 102. The received flux path 2106 is defined by a direction vector 2108 in a three-dimensional space. The three mutually orthogonal windings in the multi-axis aerial array 2104 measure the three components of the direction vector 2108.

More particularly, when the magnetic flux lines pass through the multi-axis aerial array 2104, a voltage is induced in each winding. The voltage in each winding is a measure of a component of the direction vector 2108 defining an orientation of the first magnetic induction field along the longitudinal axis of that winding. A selector module 2220 (FIG. 22b) is coupled to the windings and selects one or more of the windings for transmitting a signal back to the remote unit 104. The selection of the winding is based on the magnitude of the induced voltage in each of the windings.

Figure 22A:
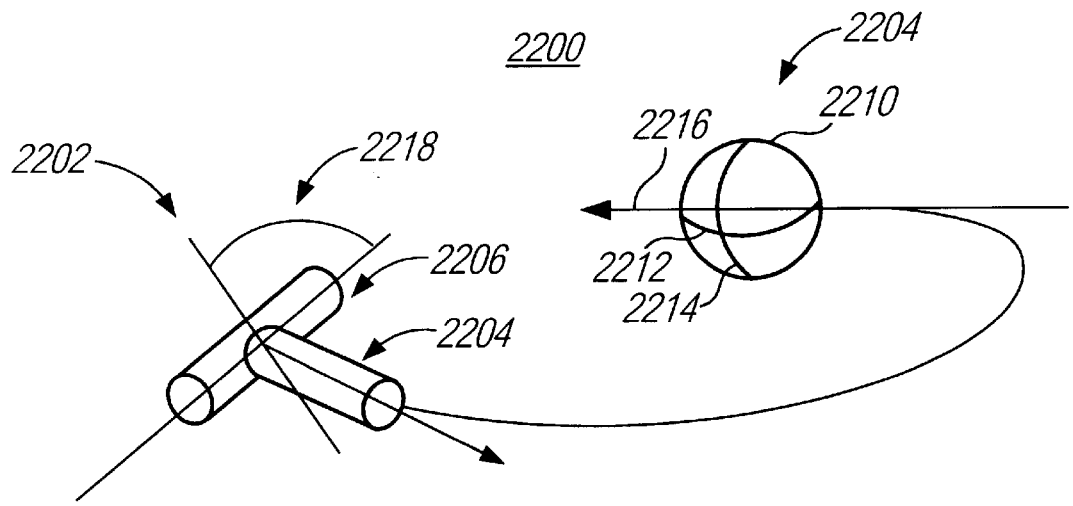
FIG. 22a is a perspective drawing of one embodiment of a vector measuring system using rotational fields in accordance with the present invention.
Figure 22B:
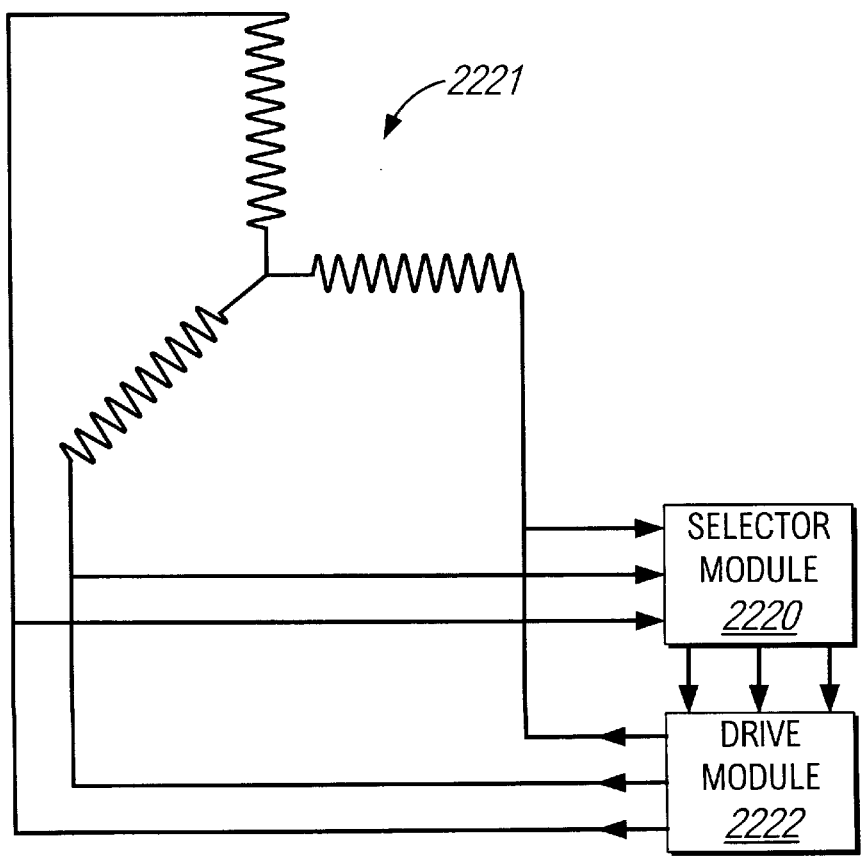
FIG. 22b is an illustration of a selector module and a drive module in accordance with the present invention.

The selector module 2220 is further coupled to a drive module 2222 (FIG. 22b). The drive module 2222 arranges a drive to each selected winding to be in proportion with the voltage in that winding for generating a second magnetic induction field that is substantially aligned with the first magnetic induction field. This second field establishes a two-way (i.e., duplex) MI link with the single-axis aerial 2102 in the remote unit 104, thus allowing communication signals to be transmitted back to the remote unit 104.

Alternatively, signals sent from the base unit 102 are transmitted via a first set of windings that are co-axial to a second set of windings used for receiving signals from the remote unit 104.

Referring to FIG. 21c, there is shown an optimum coupling between the first aerial of the base unit 102 and the second aerial of the remote unit 104. Under other relative orientations, the received signal in the base unit 102 may be reduced to approximately half that achieved under these ideal conditions.

Referring to FIG. 22a, there is shown one embodiment of a "crossed field" system 2200 that uses rotational fields as described in conjunction with FIGS. 15 and 20. The "crossed field" system 2200 preferably includes a dual-axis aerial array 2202 in the remote unit 104 and a multi-axis aerial array 2204 in the base unit 102. The dual-axis aerial array 2202 includes single-axis aerials 2206 and 2208. The multi-axis aerial array 2204 preferably includes three orthogonal windings, 2210, 2212, and 2214 disposed about a spherical, permeable core. The dual-axis aerial array 2202 sends and receives on mutually orthogonal windings disposed about single-axis aerials 2206 and 2208, respectively (not shown). When the dual-axis aerial array 2202 transmits a first magnetic induction field, voltages are induced in the orthogonal windings in the multi-axis aerial array 2204 that correspond to the components of a direction vector 2216 defining the orientation of the first magnetic induction field relative to the multi-axis aerial array 2204 in the base unit 102, as previously described in accordance with FIGS. 21a–21c. The selector module 2220 in the base unit 102 selects one or more windings for transmitting back to the remote unit 104 based on the magnitude of the voltages induced in the windings. Upon selection of those windings for transmitting back to the remote unit 104, a drive proportional to the received signal is applied by the drive module 2222 to the selected winding or windings to generate the second flux path for establishing the communication link with the remote unit 104.

Alternatively, signals sent from the base unit 102 are transmitted via a first set of windings that are co-axial to a second set of windings used for receiving signals from the remote unit 104.

Furthermore, in the "crossed field" system 2200, the multi-axis aerial array 2204 transmits in a direction orthogonal to the direction vector 2216. All directions perpendicular to the direction vector 2216 lie in the plane 2218 orthogonal to the direction vector 2216, so the second magnetic induction field transmitted from the base unit 102 must sweep the plane 2218. This requirement is met by transmitting a rotating field, as previously described, orthogonal to the direction vector 2216.

Referring to FIG. 22b, there is shown one embodiment of a selector module 2220 and a drive module 2222 in accordance with the present invention. The selector module 2220 has a plurality of inputs and outputs. The inputs are coupled to mutually orthogonal windings 2221 for receiving first signals induced in the windings 2221 by the first magnetic induction field and the outputs are coupled to a drive module 2222 for producing second signals in the'windings 2221, proportional to the first signals, for generating the second magnetic induction field.

The drive module 2222 has a plurality of inputs and outputs. The inputs are coupled to the outputs of the selector module 2220 for receiving selected first signals and the outputs are coupled to the windings 2221 for transmitting second signals.

In one embodiment of the present invention, the longitudinal axis of the one of the mutually orthogonal windings 2221 with the strongest received signal is selected by the selector module 2220 with, for example, a voltage comparator circuit that compares the magnitude of the voltages induced in each winding and then selects the winding with the highest voltage as an approximation to the direction vector 2116. Once the appropriate winding is selected by the comparator circuit, the voltage of the selected winding is coupled to the drive module 2222 using conventional switching techniques such as, for example, an electronic relay switch. The drive module 2222 then generates a voltage proportional to the received voltage in the selected windings for establishing the second magnetic induction field that is substantially aligned with the first magnetic induction field for maintaining a two-way communication link between the base unit 102 and the remote unit 104.

Aerial arrays that are made in accordance with the present invention maintain a MI duplex link between a base unit and a remote unit having a relative orientation to each other that changes over time as the user moves in their work space. Moreover, the mutually orthogonal relationship between the windings in these aerial arrays results in near zero mutual inductance between such windings, thus reducing or eliminating the need for complex duplex filtering. These aerial arrays provide a simple and inexpensive implementation.

Referring again to FIG. 20, another embodiment in accordance with the present invention is described, wherein the remote unit 2014 remains in a passive "receive only" mode and detects a search signal from the base unit 102. In this mode, the remote unit 2214 conserves power, which reduces power requirements and thus battery size.

As the base unit 102 cycles through a scanning routine, at some time the transmitted signal achieves maximum coupling with the remote unit. The remote unit 2014 transmits a carrier in the direction of the base unit 102 to indicate the presence of the remote unit 2014 to the base unit 102. The remote unit 2014 also may transmit a signal indicative of the received signal strength (RSS). In response to the RSS signal, the base unit 102 performs a peak detect and locks the plane of rotation at the appropriate angle. The RSS signal is a signal extracted in most receiver designs to operate audio squelch. The RSS signal may be transmitted by a sub-audio tone. The base unit 102 may also use the RSS signal to set the power level of the signal to optimize battery usage by the remote unit 2014. Alternatively, instead of locking on the RSS signal, the base unit 102 may process the transmitted signal from the remote unit 2014 as three vectors and redirect the transmitted signal from the base unit 102 in response to such vectors.

Once the lock is established, audio information may be transmitted on the same frequencies. This is sufficient when there is little movement between the base unit 102 and the remote unit 2014, such as between two portable appliances such as a computer and a printer. On the other hand, if there is frequent movement between the base unit 102 and the remote unit 2014, audio information is preferably communicated on other frequencies so the scanning and locking may occur during such movement and simultaneously with such communication. For example, such communication may occur between a remote unit in an audio headset and a base unit at a workstation or in a briefcase in a portable telephone system. Such a system allows the user to walk about in an area around the base unit.

Figure 23A:
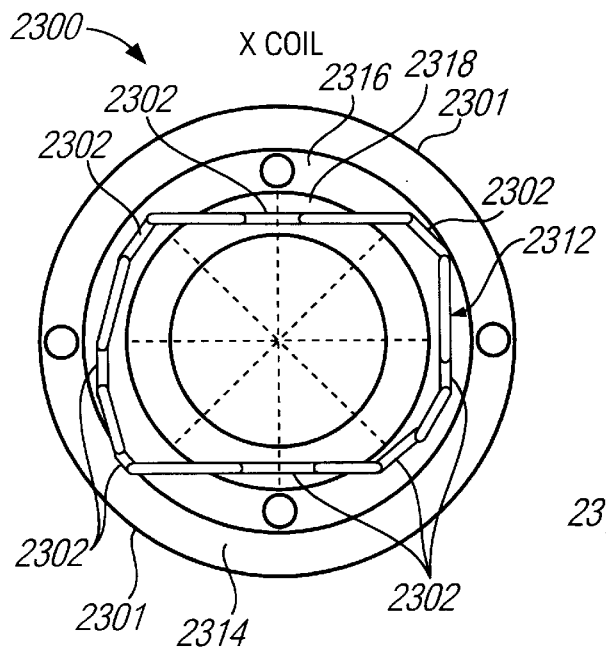
FIGS. 23a, 23b, and 23c are shown cross-sectional views of one embodiment of a tri-axial transmitting antenna array along orthogonal planes in accordance with the present invention.
Figure 23C:
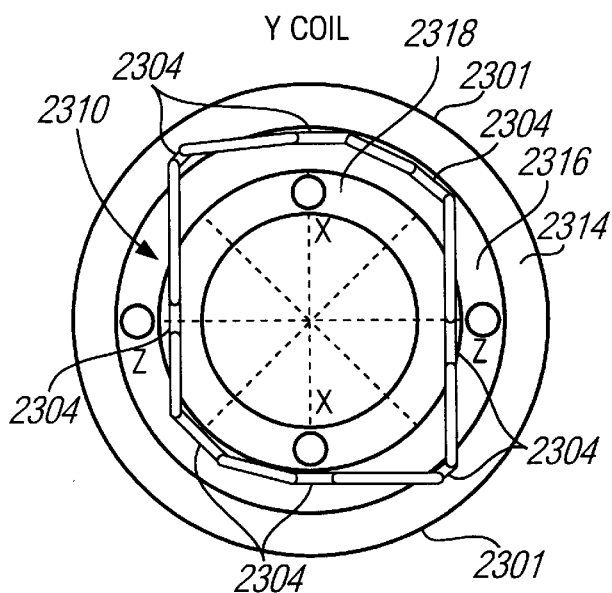
Figure 23B:
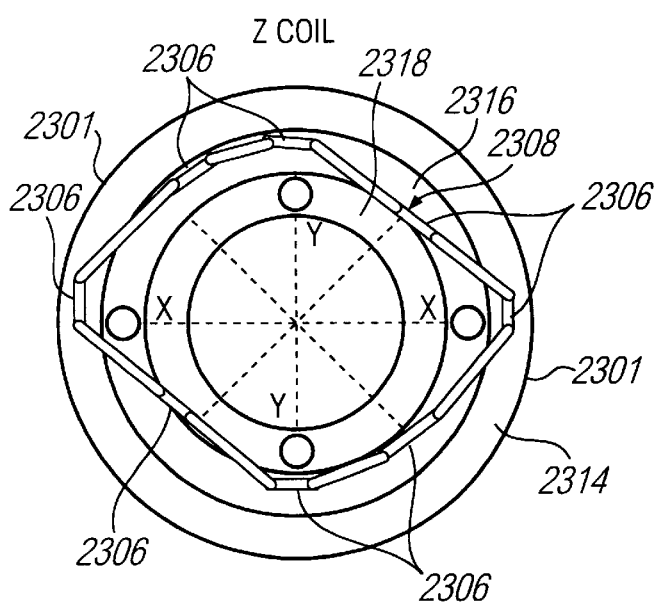

Referring to FIGS. 23a, 23b, and 23c, there are shown cross-sectional views of a tri-axial transmitting antenna array 2300 along orthogonal planes in accordance with the present invention. The tri-axial transmitting antenna array 2300 couples to the remote transceiver 112 (FIG. 1) to receive driving currents that are phase appropriately as described above in accordance with FIG. 20. The tri-axial transmitting antenna array 2300 includes a permeable core 2301, an X loop 2312, a Y loop 2310, and a Z loop 2308. Each loop 2308, 2310, 2312 is oriented at an angle relative to the other loops. The loops 2308, 2310, 2312 are of substantially identical geometry and cross sections. Likewise, the loops 2308, 2310, 2312 have substantially matching inductance, resistance, and capacitance. The core 2301 is preferably spherical. The core 2301 includes grooves 2302, 2304, and 2306 disposed on the surface. The loops 2308, 2310, 2312 are disposed within the grooves 2302, 2304, and 2306.

FIGS. 23a, 23b, and 23c show views of the array 2300 towards an X plane, a Z plane, and a Y plane, respectively. Concentric circles 2314, 2316, and 2318 are zones through which the loops 2308, 2310, 2312 pass. The X loop 2312 is disposed first and thus is inside the loops 2310 and 2312. The Y loop 2310 is disposed second, and thus is inside the Z loop 2308 and outside the X loop 2312. The Z loop 2308 is disposed third, and thus is outside both the X loop 2312 and the Y loop 2310.

The base transceiver 106 provides first, second, and third signals to the loops 2308, 2310, and 2312, respectively, to generate a magnetic field and to alter the direction of the magnetic field as described above. The base transceiver 106 may alter the direction of the magnetic field to a direction of a remote unit 104 in response to an RSS signal from the remote unit 104. The RSS signal is a carrier. The remote unit 104 alters the direction of the signal from the base unit 102 in response to the magnetic field.

The base transceiver 106 includes a scan signal in the magnetic field and the remote unit 104 provides the RSS signal at a frequency different than the frequency of the scan signal, and at a frequency different than the frequency of the first, second, and third signals.

Figure 24:
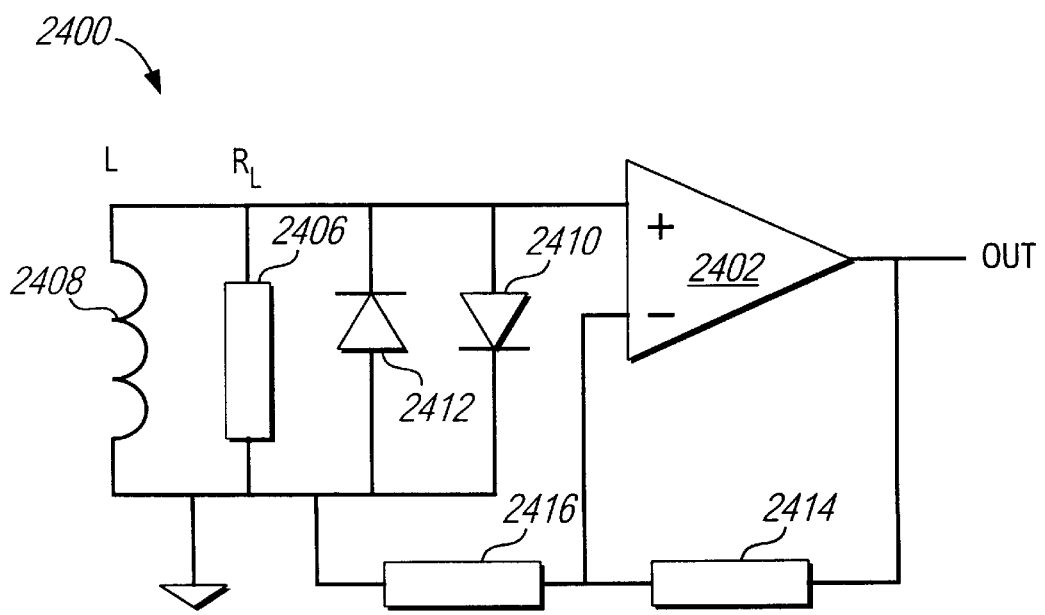
FIG. 24 is a schematic diagram illustrating a conventional pre-amplifier for an inductive receiver.

Referring to FIG. 24, there is shown a schematic diagram illustrating a conventional pre-amplifier 2400 for an inductive receiver. The conventional pre-amplifier 2400 includes an a operational amplifier 2402, a load resistor 2406, an inductor 2408, a first diode 2410 and a second diode 2412, and first and second feedback resistors 2414 and 2416. The load resistor 2406 and the inductor 2408 are shown coupled in "parallel," but an equivalent "series" pre-amplifier may be formed.

Figure 25:
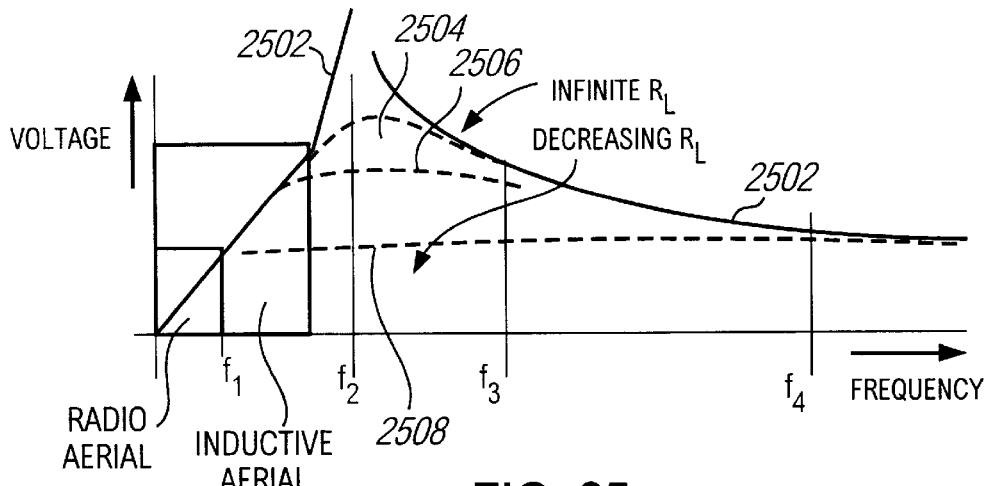
FIG. 25 is a graph illustrating the frequency response of the conventional pre-amplifier of FIG. 24.

Referring to FIG. 25, there is shown a graph illustrating the frequency response of the conventional pre-amplifier 2400. A solid line 2502 and a first dashed line 2504, a second dashed line 2506, and a third dashed line 2508 show the frequency response of the conventional pre-amplifier 2400 for varying resistance of the load resistor 2406. Stray capacitance on the coil creates a resonance in the frequency response. The difference between a low frequency (LF) induction aerial and a radio frequency (RF) aerial is the degree of separation between the normal operating frequency and the self resonant frequency of the aerial. An RF coil operates to a frequency $f_1$, typically a few MHz, but well away from self resonance. In contrast, an LP induction coil operates to a frequency $f_2$, typically tens of kHz, but close to self resonance.

At low frequencies (typically of the order of $f_1$), the coil functions as a linear inductor, and the frequency response of the coil is substantially linear up to a frequency of approximately frequency $f_1$. The output voltage obeys Faraday's Law and is proportional to frequency. RF coils having comparatively few turns on a ferrite core, operate as substantially ideal inductors and usually operate in this frequency range. The operating frequency is typically a few percent of the resonant frequency.

In contrast, low frequency coils usually include many turns to generate an adequate voltage within a volume reasonable for a communication link. Such low frequency coils typically include a multi-layer winding. Because of a significant mutual capacitance between these layers, the frequency response has a resonance, $f_2$, that is significantly closer to the operating frequency of the system. An inductive aerial typically operates at a frequency up to about 80 percent of the resonant frequency.

At frequencies above the resonance frequency, the impedance of the aerial is capacitive. At such frequencies, the aerial responds to an electric field component of environmental signals, which in this system is a source of interference. The frequencies at which this occurs is near the operating frequency of the system, and thus these frequencies are within the bandwidth of the frequency shaping pre-amplifier and the receiver of the present invention. The inductive aerial may include an electrostatic shield (not shown) to reduce the electric field component of environmental systems to thereby reduce interference. An electrostatic shield typically reduces the self-resonant frequency of the aerial.

Figure 26:
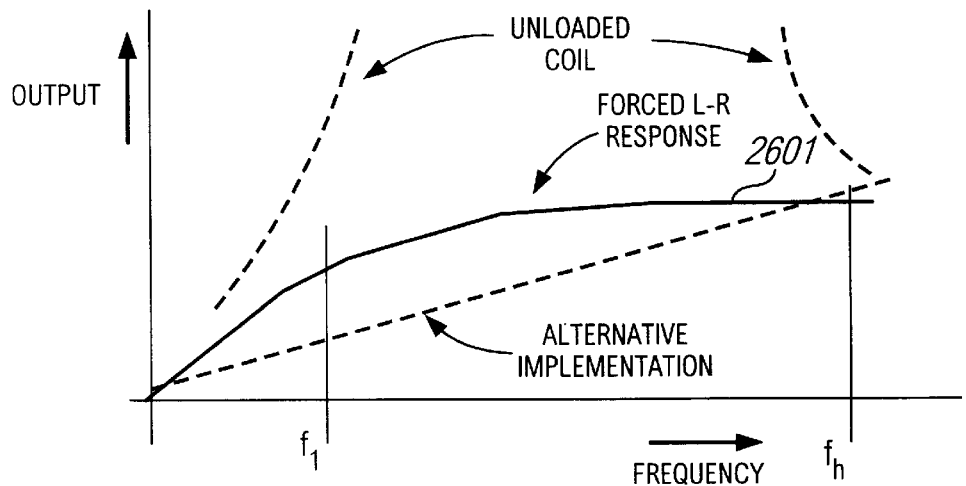
FIG. 26 is a graph illustrating the frequency response of the conventional pre-amplifier of FIG. 24 with varying load resistance.

Referring to FIG. 26, there is shown a graph illustrating the frequency response of the conventional pre-amplifier 2400 with varying resistance of the load resistor 2406. Changing the resistance of the load resistor 2406 changes the frequency response of the system. Decreasing the resistance of the load resistor 2406 reduces the Q of the resonant peak. If the load resistance is reduced to the level where its admittance dominates the capacitance of the coil, the system has a frequency response of an L-R circuit instead of an L-C-R circuit.

Such a technique has been used in cable locators to obtain operation at discrete widely spaced frequencies, as indicated by $f_1$ and $f_h$ in FIG. 26, from a single aerial. This is advantageous in that an alternative implementation with a high self resonant frequency and the same sensitivity at the frequency $f_h$ has a reduced frequency at the frequency $f_1$. However, such a technique has not been applied in the communication links described herein because the alternative implementation produces a smaller lighter aerial.

The present invention provides a communication link that reduces the amplitude variation across the bandwidth. The frequency response shown in line 2601 includes a region in which the second time derivative of the voltage is less than zero and a region in which the voltage is approximately constant. The present invention uses the high frequency zone having the approximately constant voltage. A high sensitivity low resonant frequency inductive aerial operates with a low input impedance amplifier provides a system with wideband FM performance. Alternatively, a preamplifier includes a load resistance that provides similar frequency response characteristics.

Figure 27:
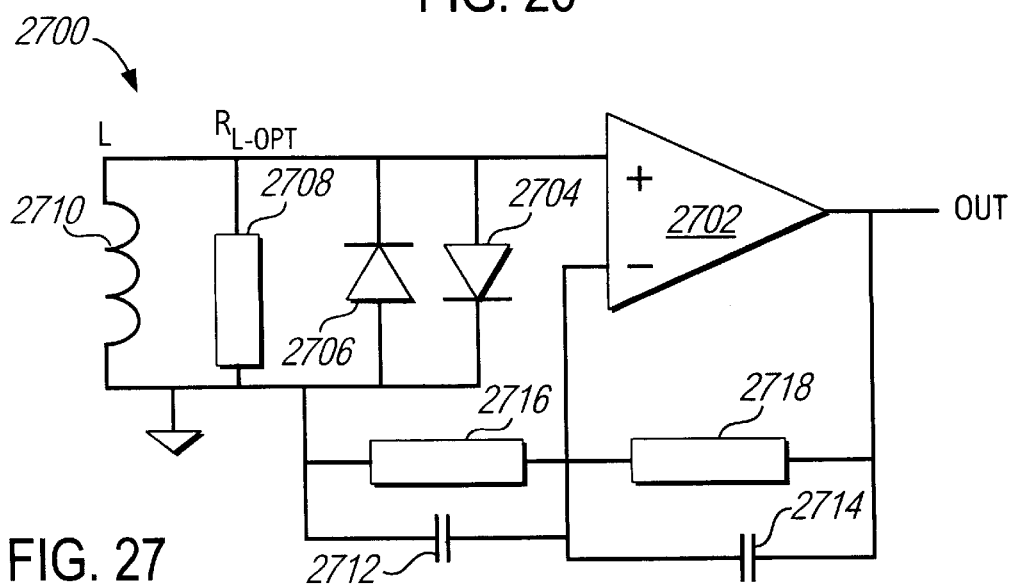
FIG. 27 is a block diagram of one embodiment of a frequency shaping pre-amplifier in accordance with the present invention.

Referring to FIG. 27, there is shown a block diagram illustrating a frequency shaping pre-amplifier 2700 in accordance with the present invention. The frequency shaping pre-amplifier 2700 includes an operational amplifier 2702, a first diode 2704 and a second diode 2706, a load resistor 2708, an inductor 2710, a first capacitor 2712 and a second capacitor 2714, and a first feedback control circuit 2716 and a second feedback control circuit 2718. The inductor 2710 represents the receiver aerial.

The first capacitor 2712 and the first feedback control circuit 2716 are coupled in parallel, and further couple a negative input terminal of the operational amplifier 2702 to ground. The second capacitor 2714 and the second feedback control circuit 2718 are coupled in parallel, and further couple a negative input terminal of the operational ampler 2702 to an output of the operational amplifier 2702. The inductor 2710, the load register 2708, and the first diode 2704 and the second diode 2706 are coupled in parallel and couple a positive input terminal of the operational amplifier 2702 to ground. An anode of the diode 2704 is coupled to a cathode of the diode 2706, and a cathode of the diode 2704 is coupled to an anode of the diode 2706. The pre-amplifier 2700 provides a substantially flat frequency response over a range above a given frequency. A preamplifier to the drive of the transmit aerial 110 (FIG. 1) may be implemented for similar frequency characteristics. The frequency response may be linearized by impedance matching and applying the spectral shaping either to the power amplifier or the preamplifier. The frequency shaping of the preamplifier in the receive channel may be implemented as shown in FIGS. 28–30.

Figure 28:
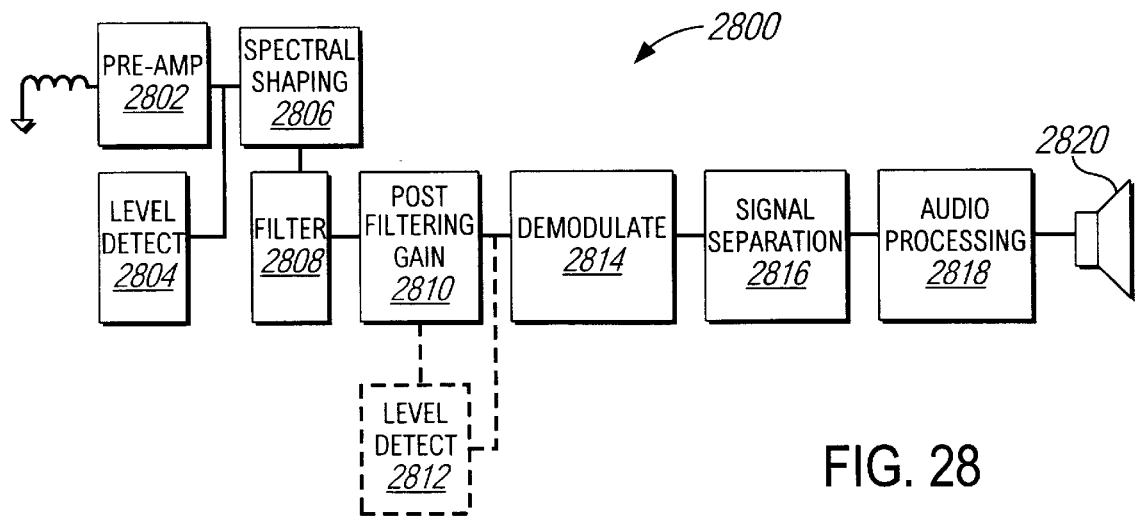
FIG. 28 is a block diagram of one embodiment of a receive circuit for a receive aerial in accordance with the present invention.

Referring to FIG. 28, there is shown a block diagram illustrating a receive circuit 2800 for a receive aerial in accordance with the present invention. 'The receive circuit 2800 includes a pre-amplifier 2802, a level detector 2804, a spectral shaping circuit 2806, a filter 2808, a post filtering gain amplifier 2810, a level detector 2812, a demodulator 2814, a signal separation circuit 2816, an audio processor 2818, and a sound transducer 2820.

Figure 29:
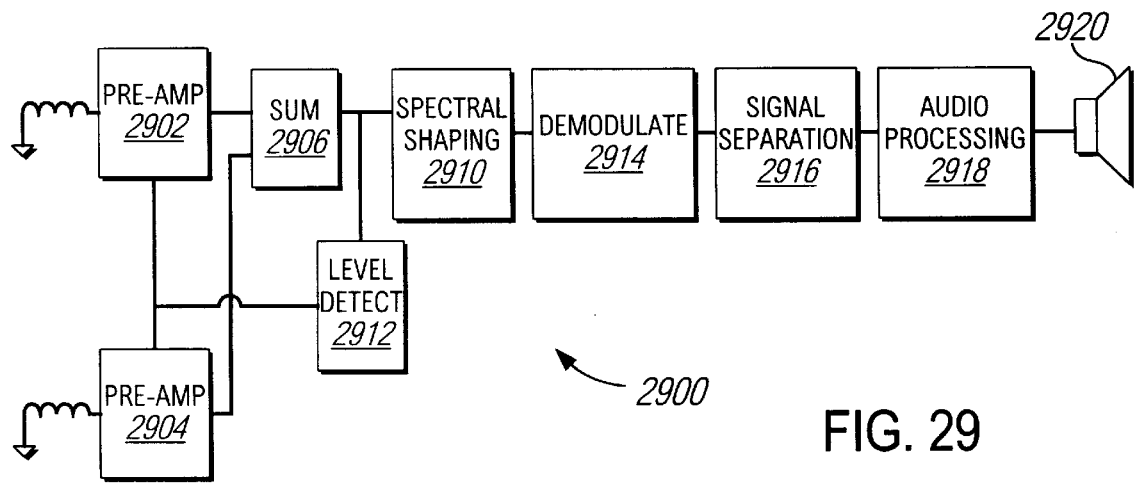
FIG. 29 is a block diagram of one embodiment of a receive circuit for a directional array in accordance with the present invention.

Referring to FIG. 29, there is shown a block diagram illustrating a receive circuit 2900 for a directional array in accordance with the present invention. The receive circuit 2900 includes a first pre-amplifier 2902 and a second preamplified 2904, a summing circuit 2906, a level detector 2912, a spectral shaping circuit 2910, a demodulator 2914, a signal separation circuit 2916, an audio processor 2918, and a sound transducer 2920.

Figure 30:
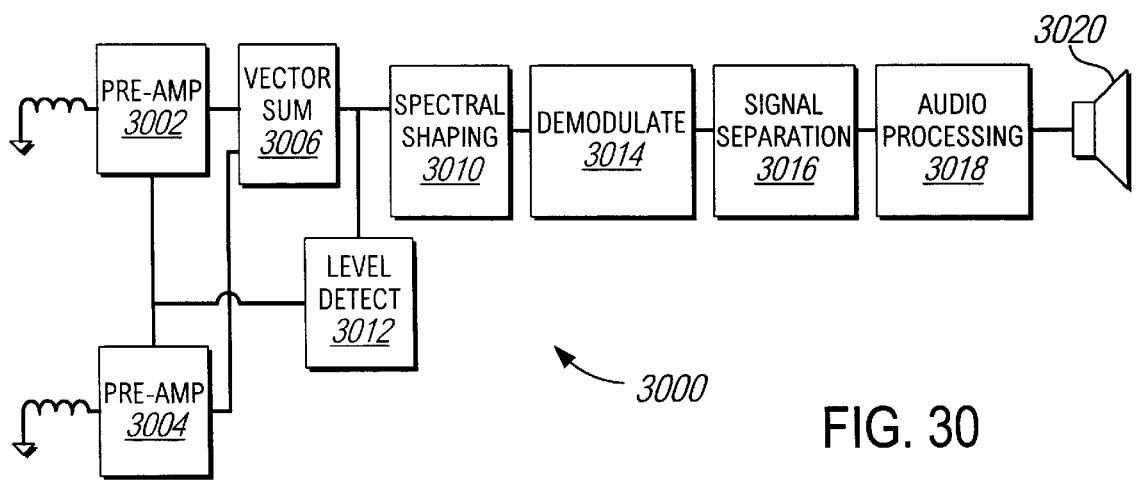
FIG. 30 is a block diagram of one embodiment of a receive circuit for a dual-axis aerial in accordance with the present invention.

Referring to FIG. 30, there is shown a block diagram illustrating a receive circuit 3000 for a dual axis aerial in accordance with the present invention. The receive circuit 3000 includes a first pre-amplifiers 3002 and a second preamplifier 3004, a vector summing circuit 3006, a level detector 3012, a spectral shaping circuit 3010, a demodulator 3014, a signal separation circuit 3016, an audio processor 3018, and a sound transducer 3020.

What is claimed is:

1. A magnetic inductive communication system that maintains a communication link between a base unit and a remote unit having a relative orientation to each other that changes over time, comprising:

a remote unit having at least one aerial for transmitting a first magnetic induction field and for receiving a second magnetic induction field, and a base unit including:

a multi-axis aerial array for transmitting the second magnetic induction field and for receiving the first magnetic induction field, the multi-axis aerial array having a plurality of windings, each producing a first signal in response to the first magnetic induction field that represents at least one component of a direction vector defining an orientation of the first magnetic induction field in 3-dimensional space;

a selector module having a plurality of inputs and outputs, the selector module inputs coupled to the windings for selecting at least one of the plurality of windings to transmit the second magnetic induction field along the direction vector; and a drive module having a plurality of inputs and outputs, the drive module inputs coupled to the selector module outputs for receiving the first signals of the selected windings, the drive module outputs coupled to the windings for generating a second signal in at least one winding, the second signal proportional to the first signal of the winding for generating the second magnetic induction field having substantially the same orientation as the first magnetic induction field.

2. The system of claim 1, wherein the longitudinal axis of the winding receiving the strongest first signal in response to first magnetic induction field is selected by the selector module as an approximation to the direction vector defining the orientation of the first magnetic induction field in 3-dimensional space.

3. The system of claim 1, wherein the second magnetic induction field rotates in a plane substantially orthogonal to the direction vector, and the second magnetic field induces a signal in a first winding in the remote unit that is located proximate to and orthogonal with a second winding.

4. The system of claim 3, wherein the first winding receives the second magnetic induction field and the second winding transmits the first magnetic induction field.

5. The system of claim 3, wherein the windings in the remote unit are mutually orthogonal and wound on a single permeable core to form a dual-axis aerial array.

6. The system of claim 1, wherein the remote unit includes a single winding that receives and transmits the first and second magnetic induction fields, respectively.

7. The system of claim 1, wherein the remote unit includes a single-axis aerial having a first winding for receiving the first magnetic induction field and a second winding, co-axial with the first winding, for transmitting the second magnetic field.

8. The system of claim 1, wherein the remote unit includes two mutually orthogonal solenoid aerials each having a single winding.

9. The system of claim 1, wherein the first magnetic induction field is a quasi-static field.

10. The system of claim 1, wherein the multi-axis aerial array comprises three mutually orthogonal single-axis solenoid aerials each having a single winding.

11. The system of claim 1, wherein the multi-axis aerial array comprises three mutually orthogonal windings wound on a single permeable core.

12. The system of claim 11, wherein the permeable core is spherical.

13. A magnetic inductive communication system that maintains a communication link between a base unit and a remote unit having a relative orientation to each other that changes over time, comprising:

a remote unit including at least one aerial for transmitting a first magnetic induction field and for receiving a second magnetic induction field, and a base unit including:
 a tri-axis aerial array for transmitting the second magnetic induction field and for receiving the first magnetic induction field, the tri-axis aerial array including at least three mutually orthogonal windings disposed about a spherical, permeable core, at least one winding producing a first signal in response to the first magnetic induction field that represents at least one component of a direction vector defining the orientation of the first magnetic induction field in 3-dimensional space;
 selector module having a plurality of inputs and outputs, the selector module inputs coupled to the windings for selecting the winding receiving a strongest first signal to transmit the second magnetic induction field along the direction vector; and
 a drive module having a plurality of inputs and outputs, the drive module inputs coupled to the selector module outputs for receiving the first signal of the winding having the strongest first signal, the drive module outputs coupled to the windings for generating a second signal in at least one winding, the second signal proportional to the first signal for generating the second magnetic induction field having substantially the same orientation as the first magnetic induction field.

14. A method of maintaining a communication link between a base unit and a remote unit having a relative orientation to each other that changes over time, comprising the steps of:

generating a first magnetic induction field and receiving a second magnetic induction field from at least one aerial in a remote unit;

producing a signal, in at least one aerial in a base unit in response to the first magnetic induction field, that represents at least one component of a direction vector defining an orientation of the first magnetic induction field in 3-dimensional space;

selecting, in response to the produced signal, at least one aerial in the base unit to transmit the second magnetic induction field along the direction vector; and transmitting the second magnetic induction field from the selected aerial in the base unit, the second magnetic induction field having substantially the same orientation as the first magnetic induction field for establishing the magnetic induction duplex link with the remote unit.

15. The method of claim 14, wherein selecting at least one aerial comprises selecting the aerial in the base unit receiving the strongest signal in response to the first magnetic induction field as an approximation to the direction vector.

16. The method of claim 14, wherein generating from the base unit a second magnetic induction field comprises generating a field that rotates in a plane substantially orthogonal to the direction vector and that induces in the remote unit a signal in a first aerial located proximate to, and orthogonal with, a second aerial for transmitting the first magnetic induction field.

* * * * *